United States Patent [19]

Yamaji et al.

[11] Patent Number: 5,316,337
[45] Date of Patent: May 31, 1994

[54] INFLATABLE BAGS FOR AIRBAG PASSIVE RESTRAINT SYSTEMS FOR FRONT SEAT PASSENGER AND METHODS FOR MANUFACTURING THEREOF

[75] Inventors: Takeshi Yamaji, Nagoya; Toru Ozaki, Toyota; Koji Sugiura, Kasugai; Kazuaki Bito, Seto; Motoaki Naruse; Hidehito Sogi, both of Nagoya, all of Japan

[73] Assignees: Toyo Tire & Rubber Co., Ltd., Osaka; Toyota Jidosha Kabushiki Kaisha, Aichi, both of Japan

[21] Appl. No.: 36,666

[22] Filed: Mar. 25, 1993

[30] Foreign Application Priority Data

Mar. 30, 1992 [JP] Japan .................. 4-105623
Oct. 22, 1992 [JP] Japan .................. 4-309300
Dec. 24, 1992 [JP] Japan .................. 4-358171
Jan. 25, 1993 [JP] Japan .................. 5-29827
Jan. 27, 1993 [JP] Japan .................. 5-32668

[51] Int. Cl.$^5$ ............................... B60R 21/20
[52] U.S. Cl. ..................... 280/743 R; 280/728 R
[58] Field of Search ........... 280/743 R, 728 R, 728 A, 280/750, 731, 732

[56] References Cited

U.S. PATENT DOCUMENTS 4,173,356 11/1979 Ross ........................ 280/728 A
4,988,118 1/1991 Good et al. ................ 280/743 R
5,022,675 6/1991 Zelchak, Jr. et al. ...... 280/743 R

FOREIGN PATENT DOCUMENTS 52-4371 2/1977 Japan .

Primary Examiner—Margaret A. Focarino
Assistant Examiner—Christopher P. Ellis
Attorney, Agent, or Firm—Flynn, Thiel, Boutell & Tanis

[57] ABSTRACT

An inflatable bag, for airbag restraint systems for a front seat passenger, of a quadrilateral prismoidal shape comprising a right-angled quadrilateral base portion adapted to face and receive the passenger by the extension of the bag upon deployment, a lip portion defining an opening for admitting gas from the system and adapted to be attached to a dashboard, upper and lower face portions, and lateral face portions having T-like or Y-like joints diverging from the lip to base portions and exhibiting a strap effect. The bag is made of a one-piece cloth, each outlining lateral side of which has longitudinally consecutive six sides of three triangular sections wherein two endmost sides and respective two adjoining sides have respectively an equal length, or longitudinally consecutive five sides wherein two endmost sides have an equal length and other two sides adjacent to the former have a total length equal to the length of a longitudinal side therebetween. When the cloth is longitudinally folded into two, the endmost sides are superposed and sewed together. Then, respective adjoining sides are superposed and sewed together, thus forming the Y-like joints and lateral face portions, or other two sides are superposed onto the longitudinal side and sewed together, thus forming the T-like joints and lateral portions, thereby shaping the prismoidal body, which is turned inside out to give the bag. The endmost sides may assume an arc-like line.

24 Claims, 21 Drawing Sheets

INFLATABLE BAGS FOR AIRBAG PASSIVE RESTRAINT SYSTEMS FOR FRONT SEAT PASSENGER AND METHODS FOR MANUFACTURING THEREOF

BACKGROUND OF THE INVENTION

1. Field of the Invention

This invention relates to airbag passive restraint systems for vehicles and more particularly, to their inflatable bags of predetermined shape for restraining movement of a passenger seated on a front seat of the vehicle relative to the instrument panel by automatic and instantaneous inflation of the bag in the case of a collision accident. The invention is also concerned with methods for manufacturing the inflatable bags using a one-piece cut cloth having a polygonal figure. More specifically stated, the invention provides bags of the kind stated that assume a generally quadrilateral prismoidal shape and exhibit a "strapless strap effect" upon deployment thereof and the manufacture thereof.

2. Statement of Related Art

Airbag passive restraint systems are used as an auxiliary means for seat belt restraints and, in the event where a vehicle fitted with them collide at an impact of more than a predetermined magnitude, are operative to restrain a seated passenger against sudden movement and protect him by instantaneous inflation of the bag. In general, airbag restraint systems are made up of an inflator for releasing gas, an inflatable bag capable of inflating by the gas, a housing for surrounding and enclosing substantially hermetically the inflator and bag, and a sensor for detecting the predetermined impact and transmitting its electric signal to the inflator.

When an airbag restraint is actuated, gas released from the inflator by an electric signal is filled in the bag and housing to exert an inner pressure upon the surface of bag, which in turn causes the bag to deploy instantaneously.

In the past, airbag passive restraint systems for vehicles have been developed for mounting them not only to the steering wheel forward of a driver's seat, but also to the instrument panel forward of a front seat abreast it.

As inflatable bags for a front seat passenger, for example, a bag as illustrated in FIG. 26 has been known. The bag is made of a cloth and comprises a cylindrical body (41) sewed together and rounded triangular lateral portions (42) sewed to the cylindrical body at both sides thereof, the cylindrical body having, on its circumferential face, a square opening (43) which is an inlet for gas flow from the inflator. At the opening (43), four retainers (44)(45), partly made of the body cloth and partly of a different cloth, are sewed to the body (41) in a sack form. The retainer fittings (44,45) are fastened to a housing for bag through its retainer (not shown) to be inserted.

In configuring the bag by sewing work, however, it was necessary to sew together both marginal portions of the cylindrical body cloth and both outer perimeters of the lateral cloths that are curved and three-dimensional and consequently, time-consuming laborious manual work has been required, which was responsible for a bottleneck to automatization of sewing operation.

On the other hand, Japanese Patent Publication No. 52-4371 (1977) discloses a method for manufacturing a bag for airbag restraint assembly from a one-piece rectangular fabric as shown in FIGS. 27a and 27b. However, since the one-piece fabric is not applied with any suitable cutting according to a predetermined pattern, sewing and shaping of the fabric into a bag requires much skillful work, and the resulting bag has extra useless remnants, which make the weight of bag heavier and impart more impact to a seated passenger than necessary upon deploying. Further, the remnants are obstructive of sewing and make the automatization of sewing by the instrumentality of a machine difficult.

More specifically, when the fabric is shaped into a bag as shown in FIG. 27a by folding and sewing, triangular extensions (52) are formed at both sides of the base wall (50) and lateral marginal portions (53) with selvages are formed on side walls (51). The sewed body is then turned inside out to give a bag as shown in FIG. 27b. In order to mount the bag to a vehicle, further the sidewalls (51) of the bag are folded inwardly at their lower parts to be sewed to the free end (55) of the body wall (54). Consequently, bulky sewed places and overlapped portions are additionally formed.

Here, the more extensive is the area of the base wall (50) that is adapted to face a passenger, the more the triangular extensions (52) are enlarged whereas the larger is the taper degree of the lateral marginal portions (53), the more they are widened. These parts (52,53) and overlapped parts are useless for the restraint of a passenger that is a purpose proper of the airbag, because these increase in weight and take up a bulk and obstruct when the bag is folded and collapsed for housing in an instrument panel. The bag thus loses its flexibility to be stiff, and is disadvantageous for the restraint of a passenger.

In mass production of such a bag, a fabric of such a rectangular or square form is usually cut out from a fabric roll by making two longer sides and two shorter sides of a rectangle to coincide with the roll direction and width direction of the roll respectively or bringing a square into parallel with the roll direction. In either case, when a cut cloth thus obtained is then subjected to folding and sewing, the resulting seam lines are parallel with the fabric grain lines. This is not good for the construction of a bag since the inner pressure is exerted in parallel with the fabric grain lines on the bag.

If a one-piece cloth is cut out from a fabric foll obliquely to the roll direction for a good construction of bag, a longer roll width will be necessary than the existing roll width that is available from conventional looms, which necessitates new investment for an installation to that end. The width of the existing looms is usually on the order of 1.5 m whereas the perimeter length of a bag as viewed from the lateral side of a vehicle is ca. 2 m. Furthermore, the yield of one-piece cloth material is decreased, and the oblique cutting is thus uneconomical. From the aspect of sewing of a cloth, bias sewing, in which an angle is made between seam lines and grain lines of the fabric, affords a higher strength than parallel sewing wherein seam lines are parallel with the grain lines of fabric.

If a three-dimensional body is shaped from the one-piece fabric so that the triangular extensions (52), whose shape is determined by the lengths of the base wall (50) and two body walls (54), assumes an isosceles triangle, the resulting bag will be symmetrical relative to the stitching lines as viewed from a lateral side of a vehicle when mounted. If a bag is shaped in a manner forming the triangular extensions (52) of a scalene triangle and the same size of the base wall (50), then the base wall (50) will be inclined toward a passenger, which is disadvantageous for restraint performances to the passenger. Thus, the one-piece fabric imposes restrictions on the shape of a bag.

In general, it is desired from the respects of restraint performances, weight and cost that a bag have its lateral configuration as viewed from a lateral side of a vehicle, such that an upper face disposed along the windshield, a lower face disposed along the instrument panel and extending to the knees of a passenger and a front face disposed vis-a-vis to the passenger assume a triangular profile. As a consequence, a freedom in designing a bag of such a shape that will satisfy the foregoing conditions of vehicle is sought and desired.

The disclosed method moreover requires a skillful art in sewing lapped sidewalls to the body wall and non-straight lines. The stitching lines are applied linearly over the whole length of the sidewalls (53) in the deployment direction of a bag, and consequently, it is further necessary to adopt a sewing technique for rendering the stitching places, on which the strength upon deployment concentrates, strong.

The known methods for manufacturing a bag for front seat passenger as well as the bags thus have posed many problems and had drawbacks.

In view of the prior art situations above, this invention has been accomplished by contriving a new one-piece cloth cut in a specified figure, from which a bag can be fashioned simply and easily.

Accordingly, a primary object of this invention is to provide a method for manufacturing an inflatable bag for airbag passive restraint systems for front seat passenger by the use of a one-piece cloth that enables rectilinear and plane sewing, thereby enabling automatic sewing work on a machine.

Another object of the invention is to provide a bag of the kind stated above and a method for manufacturing it which are characterized by the use of a one-piece cloth having such a figure that never produces useless parts when fashioned into a three-dimensional shape and requires a minimized number of sewing places and a possible smallest seam allowance whereby to yield the bag with such a light weight and a small bulk that it is readily housed in a housing for bag.

A still another object is to provide a bag and its manufacture which comprise using such a one-piece cloth that enables to impart a strap effect of regulating the flaring of the bag without the provision of any strap member.

A further object is to provide a bag and manufacturing thereof which enables a one-piece cloth after folding and sewing for fashioning of it into a three-dimensional shape to maintain its inherent or original flexibility, thereby producing a flexible bag.

A still further object is to provide a bag which is easily collapsible without any obstructs upon folding such as turn-up edges, local lapped portions, etc.

A further object is to provide a method for manufacturing a bag by the use of a one-piece cloth having such a figure that enables to enhance the degree of freedom in designing and changing the shape of the bag while considering its base (front) portion, lateral face portions, and upper and lower face portions in relation with vehicle components, e.g. an instrument panel, windshield, etc., the position and size of an opening of a housing for bag.

Yet further object is to provide a method of manufacturing a bag that enables simple sewing work and easy registering of sewing places without requiring any high skilled art, troublesome work, many steps, and much time.

These and other objects, features and advantages of this invention will become more apparent from the following description and the accompanying drawings.

SUMMARY OF THE INVENTION

The present invention for attaining the foregoing objects resides in inflatable bags for use in airbag passive restraint systems for a front seat passenger abreast a driver which bags are characterized by the figure of a one-piece cloth as their starting material, and in methods for manufacturing the bags using the one-piece cloth.

According to one facet of this invention, there is provided an inflatable bag of the kind stated assuming a generally truncated quadrilateral pyramidal body and being made of a one-piece cloth, which bag comprises a rectangular or square base portion adapted to face and receive a seated passenger by the extension of the bag upon inflation and deployment, opposing lateral face portions of a generally trapezoidal shape, and a lip portion defining a quadrilateral opening of the prismoidal body for admitting therethrough gas from the system and adapted to be fixed through a housing for bag to an instrument panel, the lateral face portions each having a T-like joint or Y-like joint diverging from the lip portion to the base portion, the T-like or Y-like joint exhibiting a strap effect capable of regulating the extension or flaring of the bag upon inflation and deployment, whereby the bag has a tapered profile diverging from the lip portion to the base portion.

The foregoing one-piece cloth constituting the bag varies depending upon intended bags, namely, a bag having lateral face portions with the T-like joints or a bag having lateral face portions with the Y-like joints.

With a bag provided with the T-like joints, a one-piece cloth comprises a first generally trapezoidal section and a second generally trapezoidal section adapted to mainly form, respectively, the upper and lower face portions of the bag, a central generally right-angled quadrilateral section adapted to form the base portion of the bag and interlinking longitudinally the first and second trapezoidal sections so that its lateral parallel sides may be adjacent to longer parallel sides of the first and second trapezoidal sections, two first generally triangular sections extending laterally from non-parallel sides of the first trapezoidal section, two second generally triangular sections extending laterally from non-parallel sides of the second trapezoidal section, and two end rectangular sections extending from at least parallel shorter end sides of the first and second trapezoidal sections and adapted to form the lip portion of the bag, the first triangular section and the second triangular section on each lateral side having, respectively, two salient opposite sides in which longitudinally remote, end sides of both sections have an equal length and mutually near sides of both sections have a total length equal to the length of the longitudinal side of the central section, and salient apex angles of both triangular sections made by the respective opposite sides totaling to 180°, the first and second triangular sections being adapted cooperatively to form the T-like joints and the lateral face portions of the bag.

In a preferred embodiment of the cloth, the end sides of the first and second triangular sections may have an outwardly curved arc-like line, not a rectilinear line.

With a bag having the Y-like joints on its lateral face portions, a one-piece cloth comprises a first, generally trapezoidal section and a second, generally trapezoidal section adapted mainly to form the upper and lower face portions of the bag, respectively, a central right-angled quadrilateral section adapted to form the base portion of the bag and interlinking longitudinally the first and second trapezoidal sections so that its parallel lateral sides may be adjacent to parallel longer sides of both trapezoidal sections, two first, generally triangular sections extending laterally from the non-parallel sides of the first trapezoidal section, two second, generally triangular sections extending laterally from the non-parallel sides of the second trapezoidal section, two third, generally triangular sections extending laterally from the longitudinal sides of the central section, and end sections extending from at least parallel shorter end sides of the first and second trapezoidal sections and adapted to form the lip portion of the bag; the first and the second triangular sections on each lateral side of the cloth having mutually remote, end sides of an equal length, the first and the third triangular sections on each lateral side having two adjoining sides of an equal length, the third and the second triangular sections on each lateral side having two adjoining sides of an equal length, the first, the third, and the second triangular sections on each lateral side being adapted cooperatively to form the Y-like joint to shape each lateral face portion.

In a preferred embodiment of the cloth, the end sides of the first and second triangular sections have an outwardly curved arc-like line, not rectilinear line.

In another embodiment of the one-piece cloth, it may have a laterally symmetrical or asymmetrical figure, on each lateral side of which the interior angle made by the adjoining sides of the first and third triangular sections is bisected into two equal angles by a first boundary line between the first trapezoidal section and the central section, the interior angle made by the adjoining sides of the third and second triangular sections is bisected into two equal angles by a second boundary line between the central and the second trapezoidal sections, the angle made by the shorter end side of the first trapezoidal section and the end side of the first triangular section is equal to the angle made by the shorter end side of the second trapezoidal section and the end side of the second triangular section, the first, second and third triangular sections have salient apex angles totaling to 360°; and the shorter end sides of the first and second trapezoidal sections are equal in length.

Further, it is preferred that the opposite sides of the third triangular section be not equal in length. This affords Y-like joints each of which consists of a transversal fraction making an angle to the deployment direction of the bag and assymmetrically bifurcated fractions to the transversal fraction, and consequently, can exhibit good strap effect without concentrating the extension force of the bag upon the joints only.

The term "strap effect" used herein means that the joints or seams, irrespective of T-like or Y-like, serve to regulate the extension or protrusion of a bag upon inflation and deployment and to promptly restore the extended bag to the original shape, thereby avoiding the countershock by the protruded bag itself against a passenger without the provision of any strap member.

According to the other facet of this invention, there is provided a method for manufacturing an inflatable bag for airbag restraint systems for front seat passenger using a one-piece cloth as described above.

In a first embodiment of method where a bag having T-like joints on its lateral face portions is manufactured from a one-piece cloth comprising the first and second triangular sections, its method comprises folding the cloth into two along a fold line that bisects the distance between the parallel shorter end sides of the first and second trapezoidal sections to register the end sides of the first and second triangular sections with each other in a superposing manner and sewing them together; standing the sewed cloth in a prismoidal shape to register the near sides of the first and second triangular sections with the longitudinal side of the central section in a superposing manner on each lateral side and sewing them together, thus forming T-like seam lines in the diverging direction of the prismoidal form and shaping a generally fructum body of quadrilateral pyramid, and turning the body inside out to yield a bag.

According to a second embodiment of this invention where a bag having the Y-like joints is manufactured by the use of a one-piece cloth comprising the first, second and third triangular sections, its method comprises folding the cloth into two along a fold line that bisects the longitudinal distance between the shorter end sides of both trapezoidal sections to superpose the end sides of the first and second triangular sections one upon the other and sewing them together; standing the sewed cloth in a prismoidal shape to register the adjoining sides of the first and third triangular sections with each other in a superposing manner and sewing them together; registering the adjoining sides of the third and second triangular sections with each other in a superposing manner and sewing them together, thus forming Y-like seam lines in the diverging direction of the prismoidal form, and shaping a quadrilateral prismoidal body; and turning the body inside out to give a bag.

In the embodiments described above, the end sections of a rectangular form are turned up along a fold line towards the trapezoidal sections and the lapped places are sewed together in lateral direction in parallel with the fold line to form quadrilateral sacks serving as retainer fittings, through which to attach a retainer of housing.

It is further preferred that after shaping of the quadrilateral prismoidal body, the central section be sewed at its four corners together with their surrounding parts in a diagonal manner, whereby air-tightness of the four corners of the base portion is enhanced and the prismoidal shape, which the bag assumes upon inflation and deployment, is ensured.

In a particular example where the one-piece cloth having a laterally symmetrical or asymmetrical figure and meeting the requisites of interior angles as stated above is used, a method for manufacturing a bag of the kind stated comprises folding the cloth along the first boundary line between the first trapezoidal and central sections to superpose the two adjoining sides of the first and third triangular setions one upon the other and sewing them together; folding the cloth along the second boundary line between the cenral and second trapezoidal sections to superpose the adjoining sides of the third and second triangular sections one upon the other and sewing them together; while registering the shorter end sides of the first and second trapezoidal sections with each other, superposing the end sides of the first and second triangular sections one upon the other and sewing them together, thus forming Y-like seam lines and shaping a truncated quadrilateral pyramidal body; and turning the body inside out to give a bag.

According to this invention, the use of a one-piece cloth having a specified figure makes it possible to manufacture a bag assuming a generally truncated quadrilateral pyramidal body whose lateral face portions each have a T-like seam line or Y-like seam line diverging from the lip to base portions, the T-like or Y-like seam line exhibiting a good strap effect without any strap member.

In particular, with a bag having the inverted Y-like seam lines on lateral face portions thereof, their horizontal or approximately horizontal fraction serves to regulate the extension of the bag upon deployment toward a passenger and their bifurcated fractions serve to disperse the extension force towards the passenger up and down, thereby attenuating the protrusion of extended bag toward the passenger.

It is particularly preferred that the Y-like seam line consist of a transversal fraction making an angle to the deployment direction of the bag and bifurcated fractions of different lengths asymmetrical thereto because the extension force due to the flaring of the bag is exerted upon and shared by fabric grains of the cloth as well as the seam lines themselves, without concentration on the seam lines only.

In case where the bag has such Y-like seam lines that the horizontal seam line assumes an arc-like curved line in a deployment direction of the bag, it forms a sagging segment cloth together with its surrounding cloth, and consequently, it is possible to share the extension force of the bag upon deployment with the segment cloth.

Further, the use of a one-piece cloth of specified figure makes it possible to provide a possible fewest sewing places and to manufacture a bag by rectilinear, plane sewing work, thus enabling automatization of the method.

It is also possible to optionally vary the lengths, angles, and shape of the outlining sides of the figure of a one-piece cloth in a wide spectrum thereby to make various one-piece cloths as desired. Consequently, it is possible to easily design an optimal bag so as to obtain its optimal dimensions and shapes for passenger restraint performances to accommodate the passenger's position relation to the mounting position of a module (housing therein the bag and an inflator) to a vehicle (dashboard).

Examples of this invention will be hereinbelow described in greater detail with reference to the accompanying drawings.

BRIEF DESCRIPTION OF THE DRAWINGS

Throughout the different figures of drawings, like parts are designated by like numerals. The drawings are not to scale.

PREFERRED EMBODIMENTS OF THE INVENTION

Now, referring to FIGS. 1 to 5, one embodiment of this invention will be described, in which a one-piece cloth of a figure shown in FIG. 1 (with seam allowances not shown) is used as a starting material for configuring an inflatable bag of airbag restraints for front seat passenger, which bag assumes a generally frustum of quadrilateral pyramid.

Figure 1:
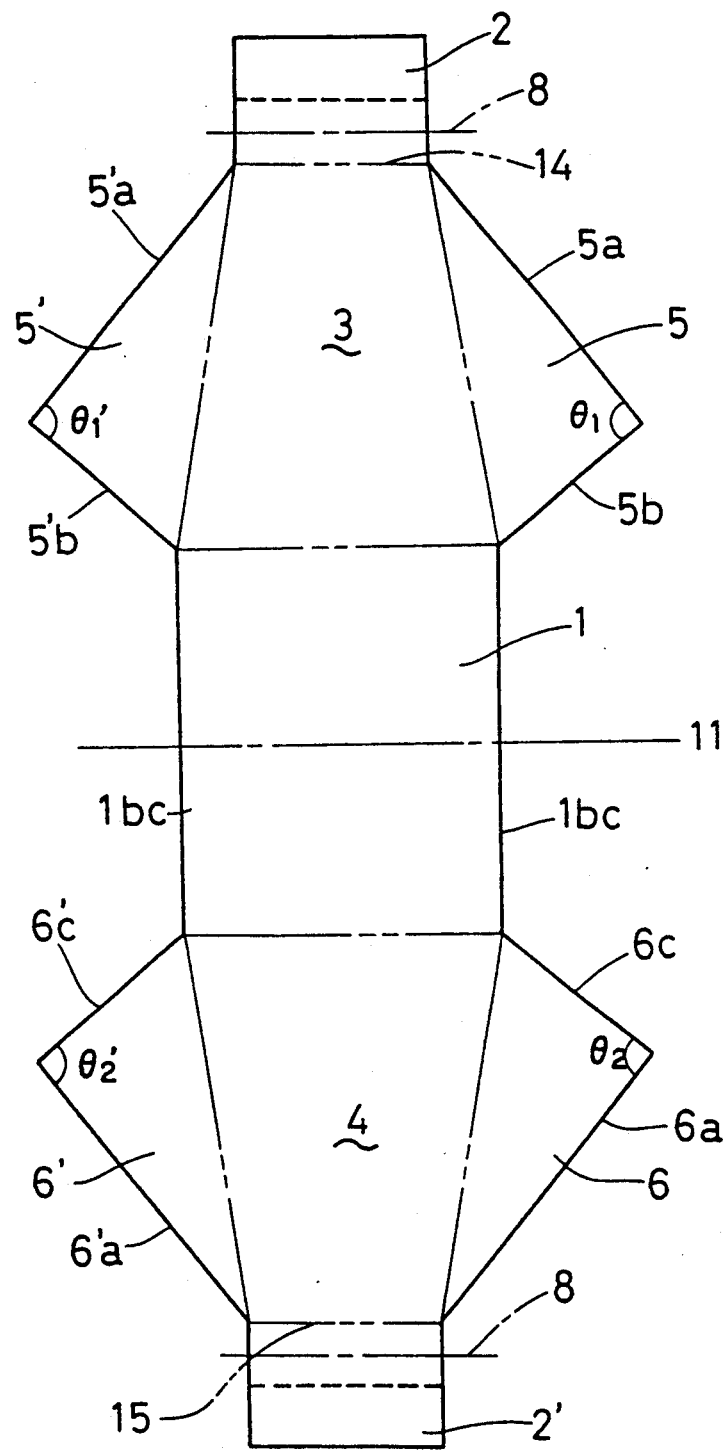
FIG. 1 is a plan view of a one-piece cloth used for one example of an inflatable bag for airbag restraint systems for front seat passenger embodying the invention.

In FIG. 1, the one-piece cloth comprises a central section 1 of square or rectangular form corresponding to the base portion of a bag, a first, generally trapezoidal section 3 and a second, generally trapezoidal section 4 mainly corresponding to the upper and lower face portions of the bag respectively and extending longitudinally from both parallel lateral sides of the central section 1 at their parallel longer sides, two first, generally triangular sections 5, 5' extending laterally from nonparallel sides of the first trapezoidal section 3, two second, generally triangular sections 6, 6' extending laterally from nonparallel sides of the second trapezoidal section 4, and two end rectangular sections 2, 2' corresponding to the lip portion of the bag and extending at least from parallel shorter end sides 14,15 of both trapezoidal sections 3,4.

Here, the figure of one-piece cloth is not limited to a laterally symmetrical or asymmetrical figure or a longitudinally symmetrical or asymmetrical figure.

On each lateral side of the figure, the first triangular section 5 and the second triangular section 6 have salient opposite sides 5a,5b; 6a,6c, respectively, in which mutually remote, end sides 5a,6a of both sections have an equal length, mutually near sides 5b,6c of both sections total to an length equal to the length of the longitudinal side 1bc of the central section 1. The apex angle $\theta_1$ of the first triangular section 5 made by the opposite sides 5a,5b and the apex angle $\theta_2$ of the second triangular section 6 made by the opposite sides 6a,6c total to the angle of 180°. Consequently, the first and second triangular sections 5,6 can be joined with each other in a manner that the end sides 5a,6a are joined together and the near sides 5b,6c are joined with the longitudinal side 1bc of the central section 1, thereby conjointly forming a T-like joint diverging from the lip portion toward the base portion of the bag.

Figure 2A:
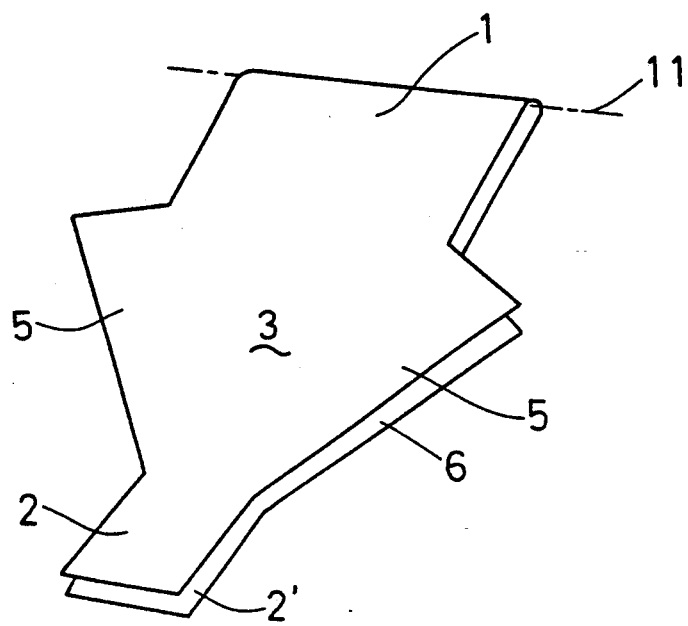
FIG. 2a, FIG. 2b, FIG. 3, FIG. 4 and FIG. 5 are schematic illustrations of a method for manufacturing a bag from the one-piece cloth in FIG. 1 according to the invention showing its sequential steps, with FIG. 5 being a perspective view of the bag at its reverse side thus manufactured.
Figure 2B:
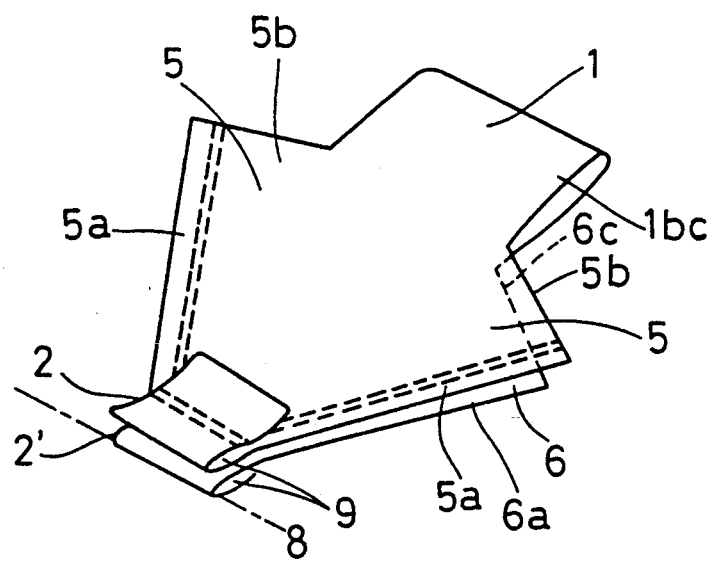

The one-piece cloth thus constructed is manufactured into a bag as follows (a laterally symmetrical example is shown in FIG. 2 to FIG. 5, but the embodiment is limited by no means to it):

The cloth is folded into two along a fold line 11 that bisects the distance between the shorter end sides 14,15 of the first and second trapezoidal sections 3,4 to superpose both trapezoidal sections 3,4 and the first and second triangular sections 5,6,5',6' one upon the other (FIG. 2a). The end sides 5a,6a, 5'a,6'a of both triangular sections 5,6,5'6' are registered with each other in a superposing manner and sewed together. The end sections 2,2' are each turned up along a fold line 8 and the lapped parts are sewed in a manner forming sacks as retainer fittings 9, through which to attach a retainer (not shown) of housing for bag (FIG. 2b).

Figure 3:
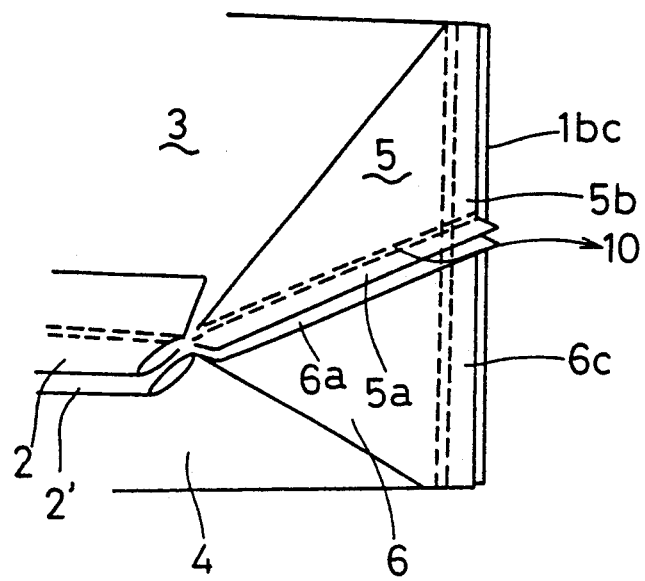

In a second step, the sewed cloth is stood in a prismoidal shape to superpose the near sides 5b,6c,5'b,6'c of the triangular sections 5,6,5',6' and the longitudinal sides 1bc of the central section 1 one upon the other, and they are sewed together (FIG. 3).

Figure 4:
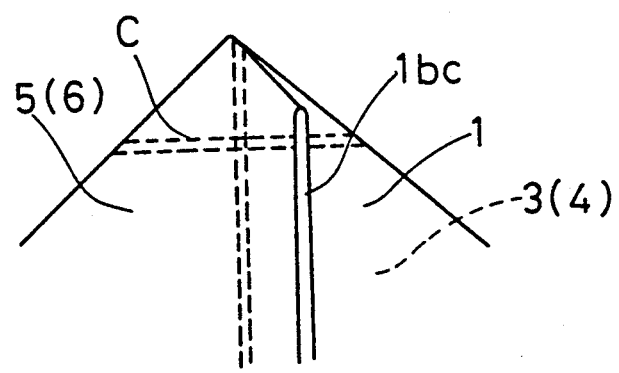
Figure 5:
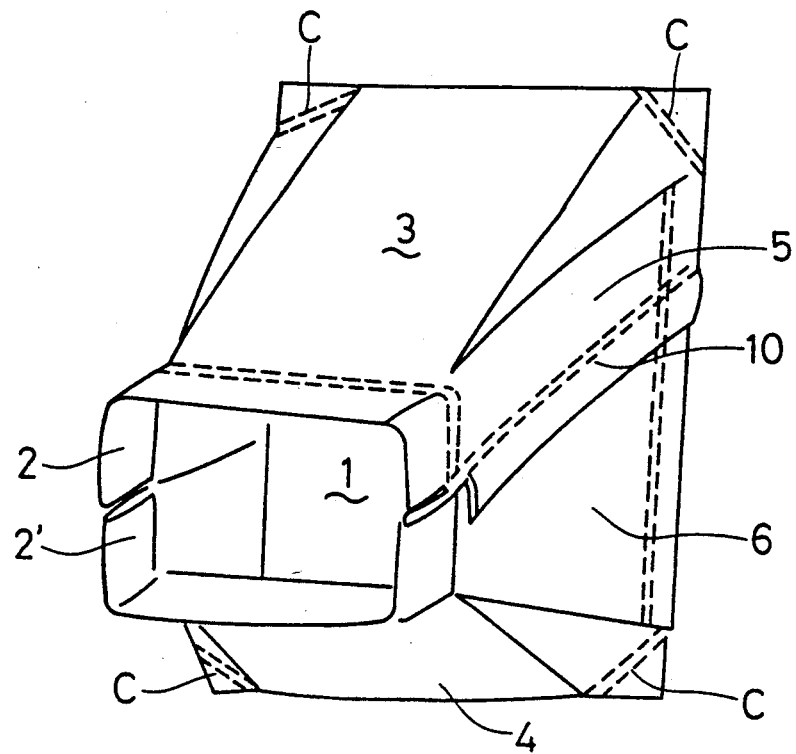

The prismoidal body thus obtained further may be sewed at four corners C of the central section 1 that are close to the seamed places 5b,1bc;6c,1bc, 5'b,1bc;6'c,1bc of the triangular sections 5,6,5',6' to the central section 1 and adjoining trapezoidal sections 3,4 in a manner that the corner parts 5,3,1; 6,4,1; 5',3,1;6',4,1 may be seamed together in a diagonal manner (FIG. 4). By this corner sewing of the central section 1, an increased air-tightness is attained and a quadrilateral prismoidal shape of bag is ensured as shown in FIG. 5, in which the bag comprises a trapezoidal upper face portion (mainly corresponding to 3), a trapezoidal lower face portion (mainly corresponding to 4), and two opposing lateral face portions assuming a trapezoidal form formed by the first and second triangular sections 5,6 or 5',6' and a part of adjoining sections 3,4. Each of the lateral face portions of the bag is formed with a T-like seam line 10 diverging from the lip portion toward the base portion.

The bag shown in FIG. 5 is turned inside out to give the bag at its observe side.

In this manner, the manufacture of bag is enabled by rectilinear, plane sewing and in significantly simplified steps because of small number in sewing places.

Mass production by automatized process is also possible. In the case of performing automatic manufacture, a sewing jig tool shown in FIG. 6 can be used to facilitate positioning of the cloth upon superposing. The tool is made up of an upper jig having a through-hole 27 and a lower jig having a through-hole 27 and positioning pins 26. From superposed marginal places to be sewed, on seam allowances of the cloth (5a,6a in FIG. 6), flaps 28 having a hole are extended to insert the pins 26 of the jig into the flaps 28. The cloth is thereby pinched with the jig tool and automatic sewing is enabled through the upper and lower through-holes 27.

Another embodiment of a bag and its manufacture is shown in FIG. 7 to FIG. 11.

Figure 7:
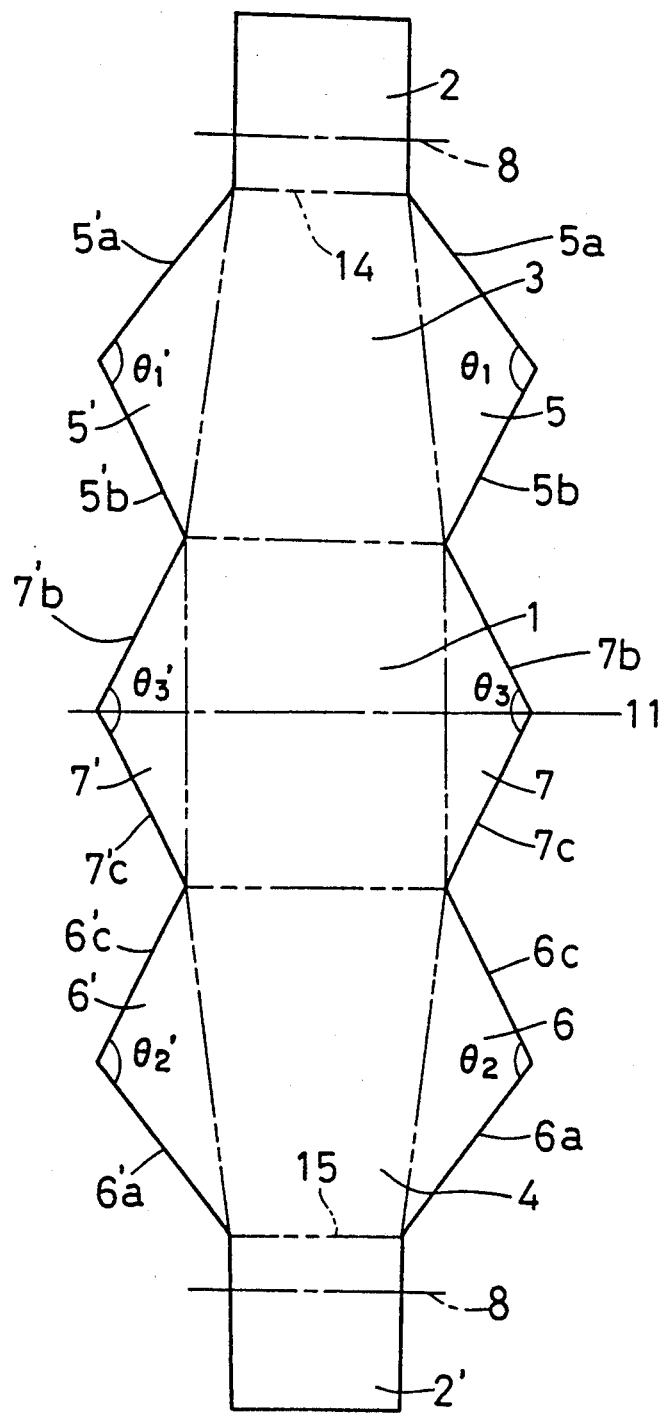
FIG. 7 is a plan view of another one-piece cloth used for another example of bag embodying this invention.

Another example of one-piece cloth for fashioning therefrom a quadrilateral prismoidal bag is illustrated in FIG. 7, with seam allowances omitted.

The cloth comprises a first, generally trapezoidal section 3 and a second, generally trapezoidal section 4 adapted to mainly form the upper and lower face portions of the bag, a rectangular or square central section 1 interlinking longitudinally the first and second trapezoidal sections 3,4 so that its lateral sides may coincide with parallel longer sides of the first and second trapezoidal sections and adapted to form the base portion of the bag, two first, generally triangular sections 5,5' extending laterally from non-parallel sides of the first trapezoidal section 3, two second, generally triangular sections 6,6' extending laterally from non-parallel sides of the second trapezoidal section 4, two third, generally triangular sections 7,7' extending laterally from the longitudinal sides of the central section 1, and two end rectangular sections 2,2' extending at least from the parallel shorter end sides 14,15 of the first and second trapezoidal sections 3,4 and adapted to form the lip portion of the bag.

Here, the first triangular sections 5,5', the second triangular sections 6,6' and the third triangular sections 7,7' are adapted to cooperatively form the lateral face portions of the bag. To that end, on each lateral side of one-piece cloth, mutually remote, end sides 5a,6a of the first and second triangular sections 5,6 are equal in length; adjoining sides 5b,7b of the first and third triangular sections 5,7 are equal in length; and adjoining sides 7c,6c of the third and second triangular sections 7,6 are equal in length, so that the end sides 5a,7b may be joined together, the adjoining sides 5b, 7b may be joined together, and the adjoining sides 7c,6c may be joined together.

The apex angle $\theta_1$ made by the opposite sides 5a,6b, the apex angle $\theta_3$ made by the opposite sides 7b,7c, and the apex angle $\theta_2$ made by the opposite sides 6a,6c are not limited to sum to 360°, but may be larger or smaller.

Figure 12:
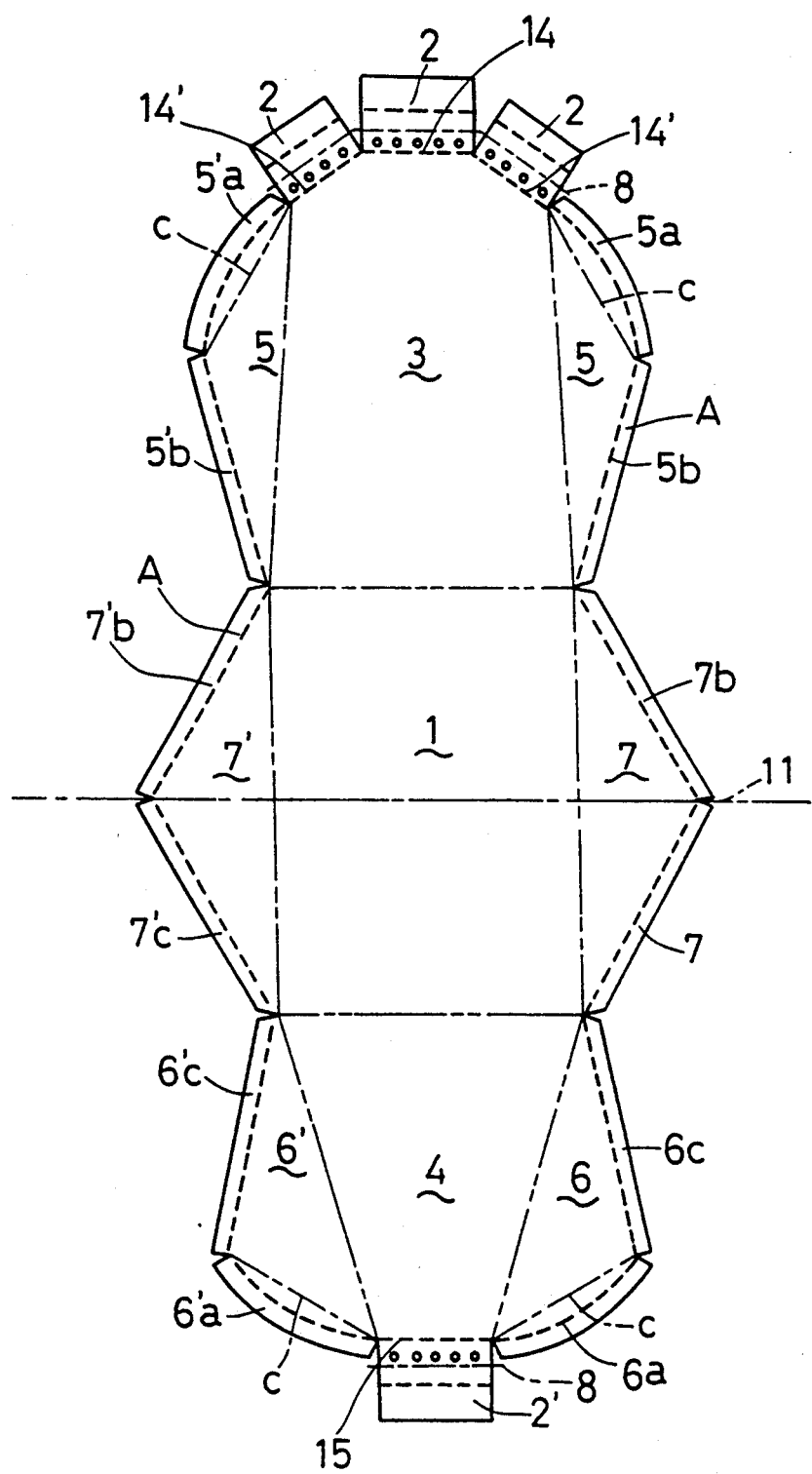
FIG. 12 is a plan view of further one-piece cloth for use in a further example of a bag embodying the invention.
Figure 24:
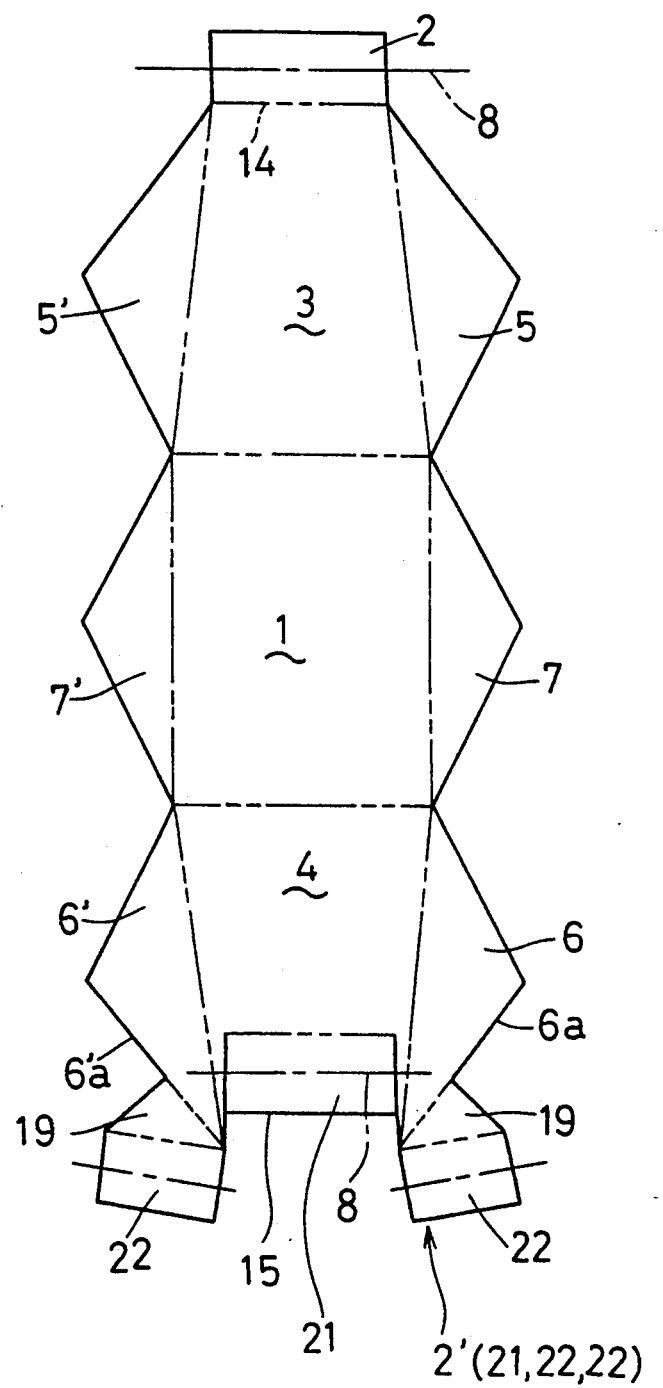
FIG. 24 is a plan view showing a variant of one-piece cloth similar to FIG. 16 for making therefrom another variant of a lip portion of bag.

The end sides 2,2' are not limited to the example shown in FIG. 7, but another examples as shown in FIGS. 12,24 may also be applied.

The third triangular section 7 on each lateral side may be a scalene or isosceles triangle in the opposite sides 7b,7c, but the former example is preferred.

Where a line spanning the width length between the apex points of the first triangular sections 5,5', a line spanning the width between the apex points of the second triangular sections 6,6' and a line between the apex points of the third triangular sections 7,7' are equal in length, it is possible to minimize the cutting width of a fabric, thereby to enhance the yield of the fabric and to use a fabric of small width.

Figure 8A:
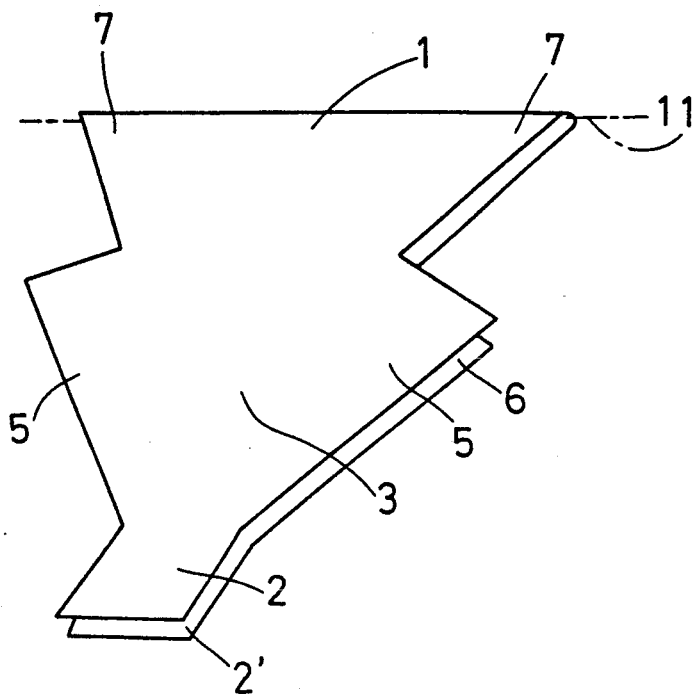
FIG. 8a, FIG. 8b, FIG. 9 and FIG. 10 are schematic illustrations showing sequential steps of another method for manufacturing a bag using the one-piece cloth in FIG. 7, with FIG. 10 being a perspective view of the bag at its reverse side thus manufactured.
Figure 8B:
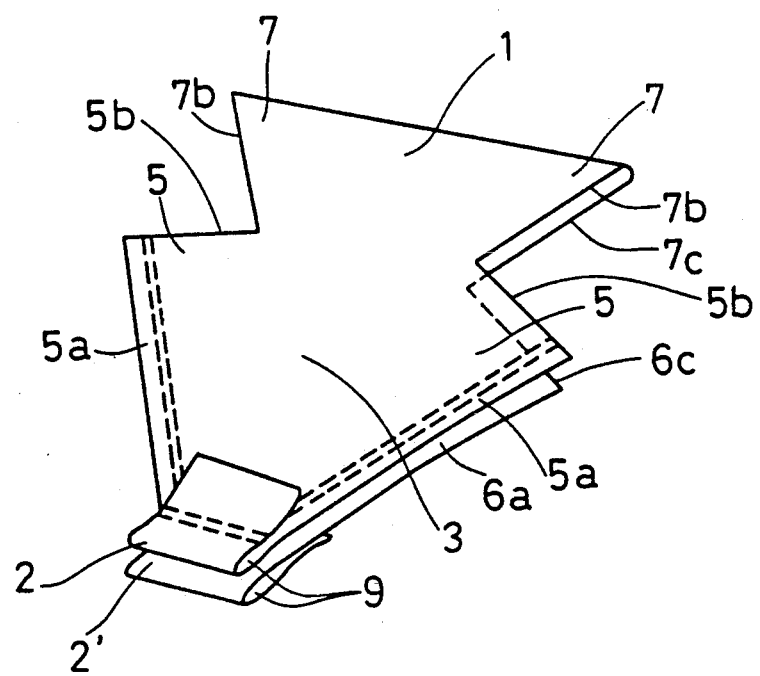
Figure 9:
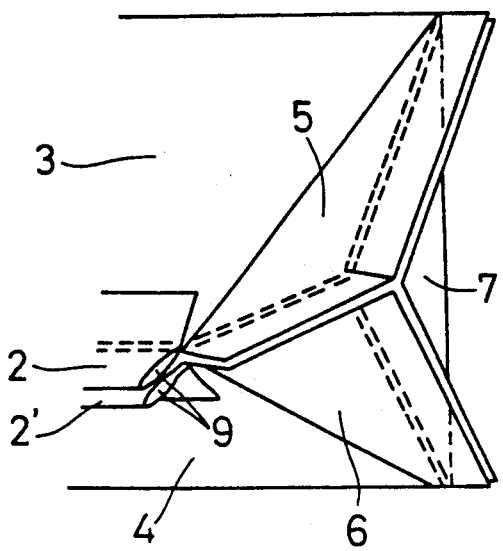
Figure 10:
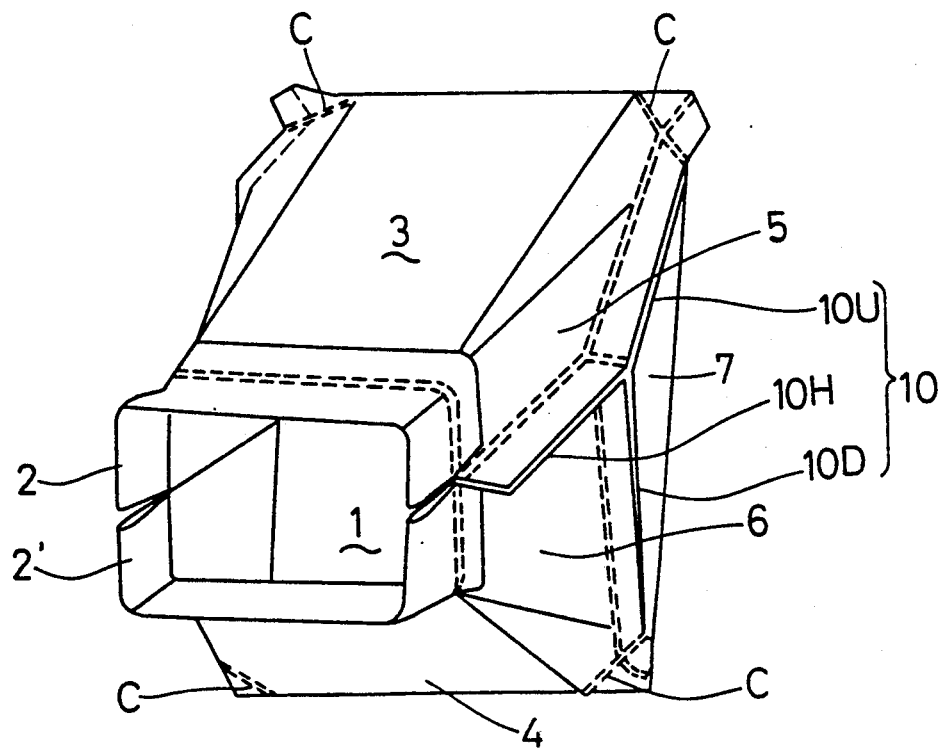

From a one-piece cloth as shown in FIG. 7, a bag is manufactured as shown in FIG. 8 to FIG. 10, wherein the primed marks are omitted for convenience sake.

The one-piece cloth is folded into two along a fold line 11, bisecting the distance between the shorter end sides 14,15 of the first and second trapezoidal sections 3, 4, to register the end sides 5a,6a;5'a,6'a of the first and second triangular sections 5,6,5',6' with each other in a superposing manner (FIG. 8a). The end sides 5a,6a,5-'a,6'a are sewed together, respectively, and the end sections 2,2' are each turned up along a fold line 8 toward the trapezoidal section 3 or 4 and the lapped places are sewed in a manner forming sacks as retainer fittings 9 (FIG. 8b).

Next, the sewed cloth is stood up in a prismoidal shape, and the adjoining sides 5b,7b, 5'b,7'b of the first and third triangular sections 5,7,5',7' and the adjoining sides 7c,6c,7'c,6'c of the third and second triangular sections 7,6,7',6' are respectively superposed one upon the other and sewed together (FIG. 9).

The quadrilateral pyramidal body thus shaped is further sewed at four corners C of the central section 1 corresponding to the base portion of the bag as shown in FIG. 10, whereby a truncated quadrilateral pyramidal shape profiled by four generally trapezoidal portions is ensured and air-tightness of the corners C is enhanced.

The prismoidal body is then turned inside out to yield a bag.

The bag thus manufactured has two lateral face portions on which Y-like seam lines 10 diverging from the lip portion (corresponding to 2,2') to the base portion (corresponding to the central section 1) are formed, which consist of a horizontal seam line $10_H$ and an upwardly slanting seam line $10_U$ and a downwardly slanting seam line $10_D$.

When the bag is inflated and deployed, the horizontal seam line $10_H$ functions to regulate the extension toward a passenger and the bifurcated seam lines $10_U$, $10_D$ function to disperse the extension force toward the passenger up and down thereby to attenuate the flaring of bag toward the passenger. This yields a strapless strap effect that excessive extension of the bag is regulated without the provision of any strap member.

It is preferred that the one-piece cloth have the third triangular sections 7,7' of a scalene triangle, since the resulting bag has on its lateral face portions the Y-like seam lines such that the extension force of the bag upon inflation and deployment is shared by the fabric grains as well as the approximately horizontal seam line, and consequently, any countershock by the flaring of bag against the passenger is avoided.

Figure 6:
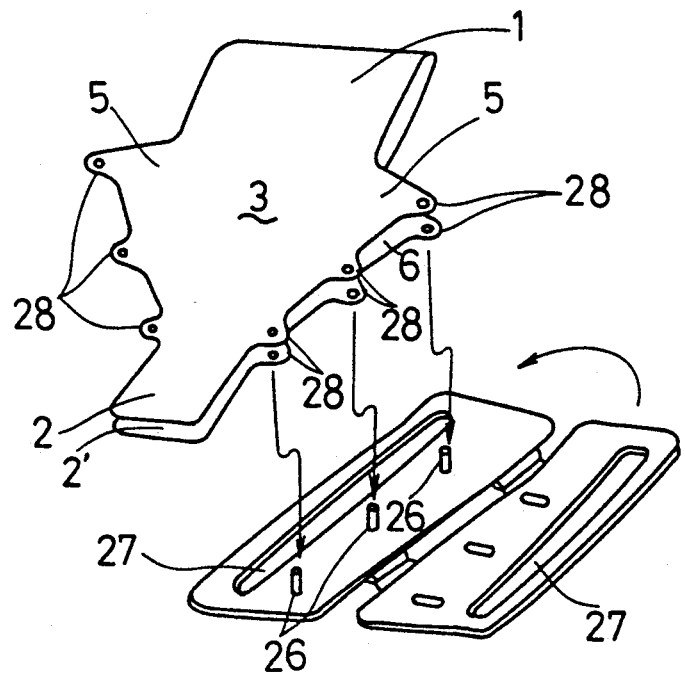
FIG. 6 is an illustration showing a jig tool which can be used for automatic sewing work according to a method of this invention.

Since the method is carried out by sewing on plane, straight lines only, it is also possible to conduct automatic sewing with the aid of a sewing jig tool as shown in FIG. 6.

In sewing the corners C of the central section 1 and the T-like or Y-like joints 10, welt stitching can also be applied to fortify these seaming places.

Figure 11:
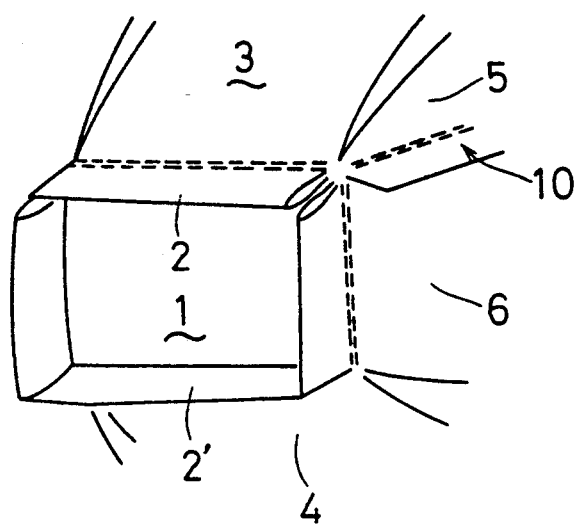
FIG. 11 is a fragmentary perspective view of another example of a lip portion of a bag pertaining to this invention.

At the lip portion of a bag to be attached to a retainer (not shown), it is also possible to modify to form it in a manner that one end portion 2' has a longer length than the other end section 2 and surrounds three end sides of the four trapezoidal portions of the bag, as shown in FIG. 11.

A further embodiment of this invention is shown in FIG. 2 to FIG. 15, in which another one-piece cloth (FIG. 12) as one example of the one-piece cloth in FIG. 7 is used to manufacture a bag for front seat passenger.

The one-piece cloth shown in FIG. 12 has a similar construction to that in FIG. 7 except that the first triangular sections 5,5' and the second triangular sections 6,6' have end sides assuming outwardly curved arc-like lines 5a, 6a;5'a,6'a of respective equal lengths, the first trapezoidal section 3 has a modified trapezoidal shape such that the shorter end side 14 is declined at both edges and accordingly, has, on both sides of the central shorter side 14, two declining shoulders 14',14', and the one end section 2 on the first trapezoidal section 3 side includes three separate subsections extending from the central shorter side 14 and both shoulders 14',14' of the first trapezoidal section 3.

Here, the cloth is illustrated together with seam allowances A outside the stitching lines to be sewed shown in dotted lines. Naturally, the adjoining sides 5b,7b;5'b, 7'b of the first and third triangular sections 5,7;5',7' are equal in length, and the adjoining sides 7c,6c;7'c,6'c of the third and second triangular sections 7,6,7',6' are equal in length.

The arc-like curve lines 5a,5'a,6a,6'a extend outwardly from their respective chord lines c.

The one-piece cloth thus constructed is also manufactured into a prismoidal bag in a similar procedure to that described in the previous embodiment.

Figure 13:
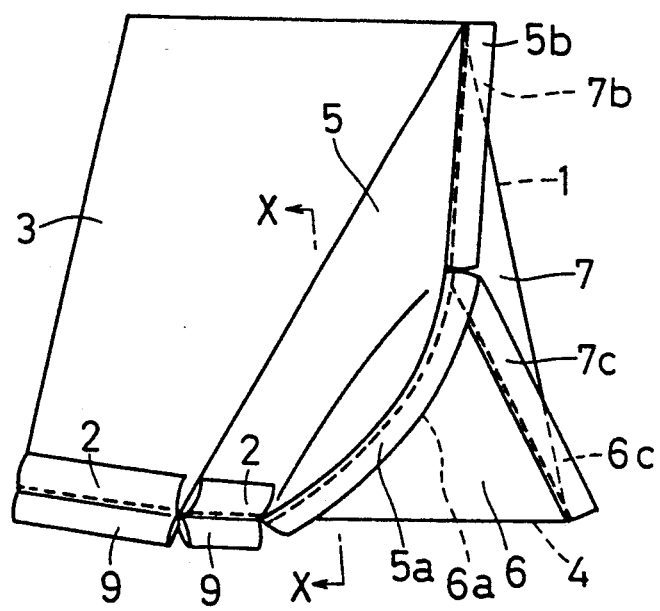
FIG. 13 is a perspective view of a further example of a bag at its reverse side manufactured by the use of the one-piece cloth in FIG. 12.

First, the end sections 2,2' are folded up along the fold line 8 and the lapped places each are sewed together to form a sack as a retainer fitting 9. The cloth is folded along the fold line 11 into two and the arc-like sides 5a,6a of the first and second triangular sections 5,6 on each lateral side are superposed one upon the other and sewed together. The adjoining sides 5b,7b and the adjoining sides 7c,6c on each lateral side are respectively superposed and sewed together (FIG. 13). Finally, the resulting prismoidal body so far reversed is turned inside out to give a bag.

Figure 14A:
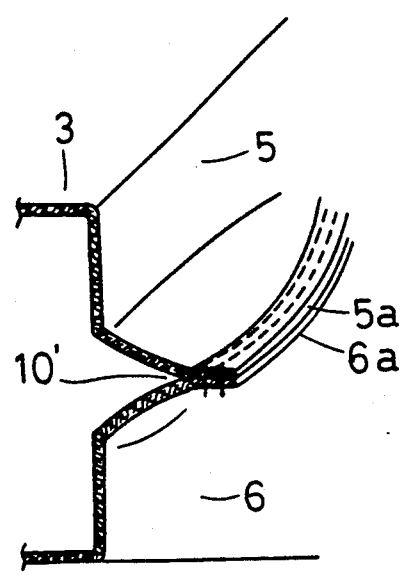
FIG. 14a and FIG. 14b are partial sectional views in perspective of the bag in FIG. 13 taken along X—X line in FIG. 13 showing the curved seam line and its surroundings.
Figure 14B:
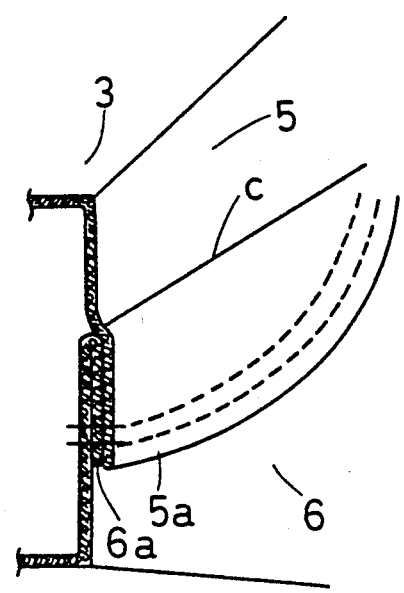

The bag thus obtained has a segment-like frange portion 10' formed protrusively on each lateral face portion thereof as shown in FIG. 14a, but it is possible to fold back the segment-like portion 10' along the chord lines c upwardly or downwardly to sew it to the cloth on an arc line.

Figure 15:
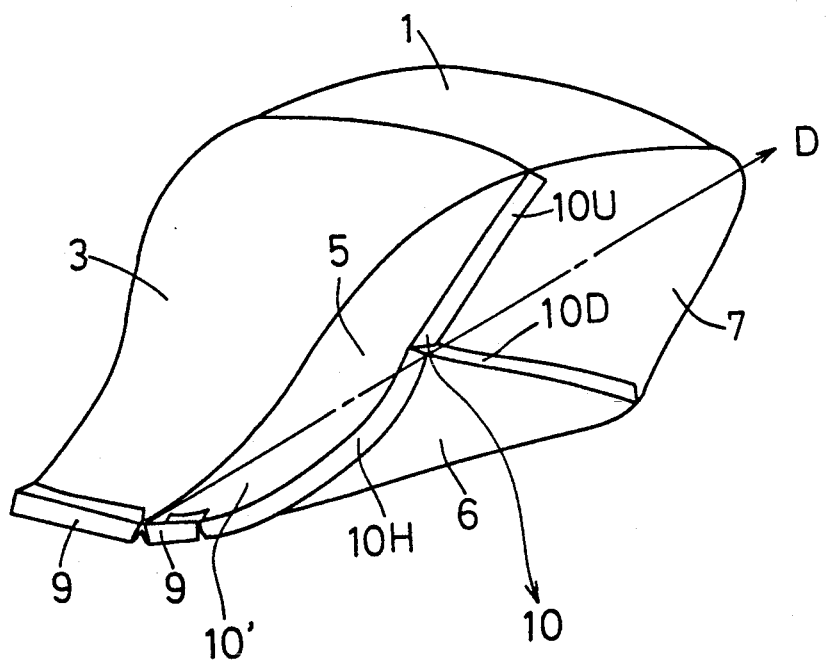
FIG. 15 is an illustrative representation of a bag at its reverse side made of the one-piece cloth in FIG. 12 showing its deployment state.

In this manner, the bag is formed on each lateral face portion thereof with the Y-like seam lines 10 whose horizontal fraction $10_H$ has therearound the segment portion 10', irrespective of projecting or folded back (FIG. 14a, FIG. 14b), relative to the deployment direction D of the bag as shown in FIG. 15, and consequently, is capable of sharing the extension force due to deployment with the surrouding segment portions 10'. The horizontal fraction $10_H$ further can regulate the extension of bag upon inflation toward the passenger, and the bifurcated fractions $10_U$,$10_D$ can disperse the extension force up and down, thereby attenuating the flaring of bag toward the passenger.

Thus the process steps can be carried out mostly by rectilinear, plane sewing of minimized sewing places, and accordingly, by automatized sewing.

Figure 16:
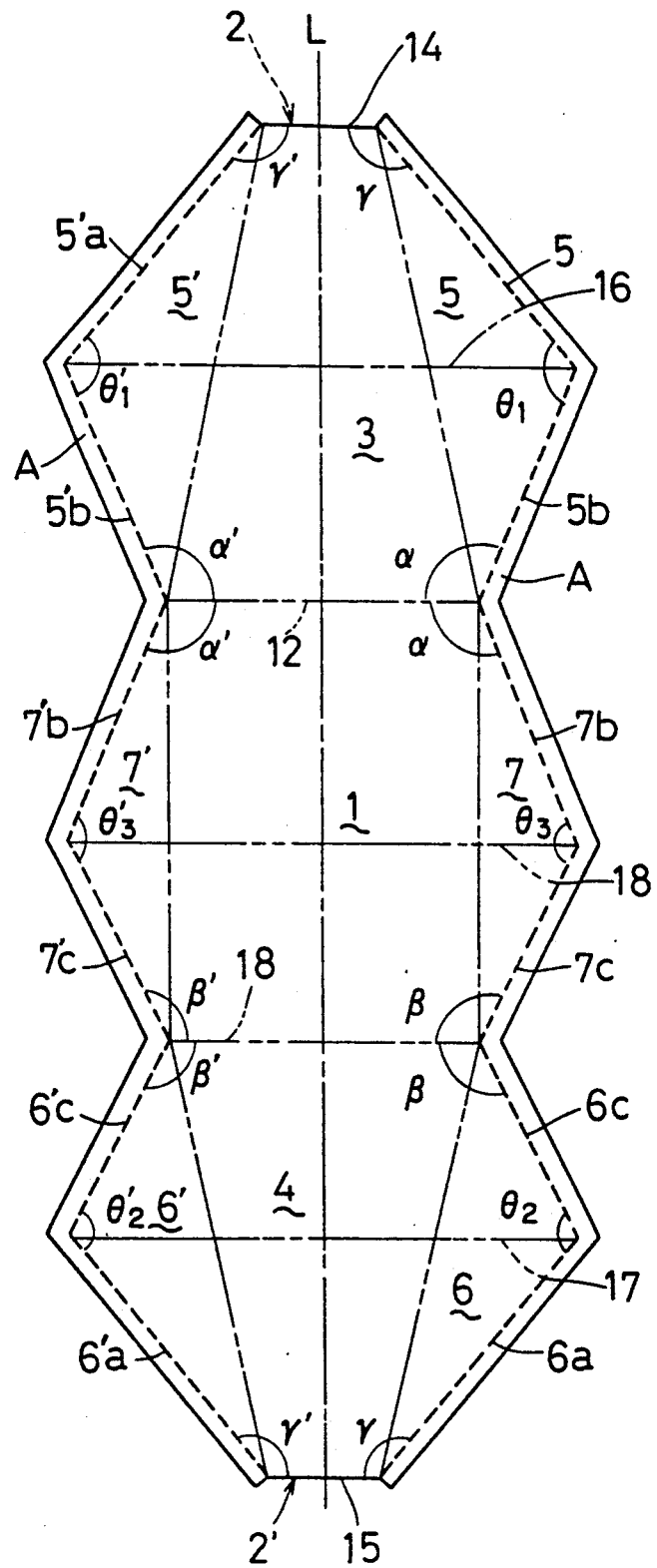
FIG. 16 is a plan view of another one-piece cloth for use in a further example of method of manufacturing a bag according to this invention.

A still further embodiment is shown in FIG. 16 to FIG. 21, wherein another method for manufacturing a bag is applied by the use of a still further example of one-piece cloth shown in FIG. 16. FIG. 16 is illustrated with end sections 2,2' omitted.

The one-piece cloth in FIG. 16 is another example of FIG. 7, and has a figure except end sections 2,2' that may be laterally symmetrical or asymmetrical relative to a mid-longitudinal axis L. FIG. 17 to FIG. 20 illustrate an example of a one-piece cloth having a laterally symmetrical figure. The first and the second trapezoidal sections 3,4 are constituted to have shorter end sides 14, 15 of an equal length.

Further, the figure of the one-piece cloth has the angle requisites on each lateral side thereof: The angle $\gamma$ made by the shorter end side 14 and the end side 5a of the first triangular section 5 is equal to the angle $\gamma$ made by the shorter end side 15 and the end side 6a of the second triangular section 6; the interior angle made by the adjoining sides 5b,7b of the first and third triangular sections 5,7 is bisected by a first boundary line 12 between the first trapezoidal section 3 and central section 1 into two equal angles $\alpha, \alpha$; the interior angle made by the adjoining sides 7c,6c is bisected by a second boundary line 13 between the central and second trapezoidal sections 1,4 into two equal angles $\beta, \beta$; the salient apex angle $\theta_1$ of the first triangular section 5, the salient apex angle $\theta_2$ of the second triangular section 6, and the salient apex angle $\theta_3$ of the third triangular section 7 mount to 360° in total.

Because of the construction above, when the figure is folded along the first boundary line 12, a trapezoidal section delimited by a line 16 spanning the distance between the apex points of the first triangular sections 5,5, the sides 5b,5b and the line 12 coincides with a trapezoidal section delimited by a line spanning the distance between the apex points of the third triangular sections 7,7, the sides 7b,7b and the line 12; when the figure is folded along the second boundary line 13, a trapezoidal section delimited by the line 18, the sides 7c,7c and the line 13 coincides with a trapezoidal section delimited by the line 13, the sides 6c,6c and a line 17 spanning the distance between the apex points of the second triangular sections 6,6; when the figure is folded and superposed with the parallel shorter end sides 14,15 registered with each other, a trapezoidal section delimited by the shorter end side 14, the sides 5a, 5a and the line 16 coincides with a trapezoidal section delimited by the line 17, the sides 6a,6a and the shorter side 15.

When a one-piece cloth having the figure of FIG. 16 is cut out from a fabric roll, while the longitudinal axis L of the figure is put in coincidence with winding direction of the roll and accordingly, the transverse shorter side of the figure is put in coincidence with the width direction of the roll, the cloth is cut out along with seam allowances A of a required breadth which surround the triangular sections 5,6,7.

In designing the dimensions of a one-piece cloth, it is first essential to determine the shape of the central section 1 adapted to directly receive the passenger, namely its lengths of lateral and longitudinal section. Next, the heights of both trapezoidal sections 3,4 are determined, and then, the lengths of the shorter sides 14,15 at the end sections 2,2' and the lengths of the opposite sides 7b,7c of the third triangular sections 7,7' are determined. With the shorter end sides 14,15, it is not always necessary to conform their lengths to lengths of a housing to be mounted, as will be later described.

Figure 17:
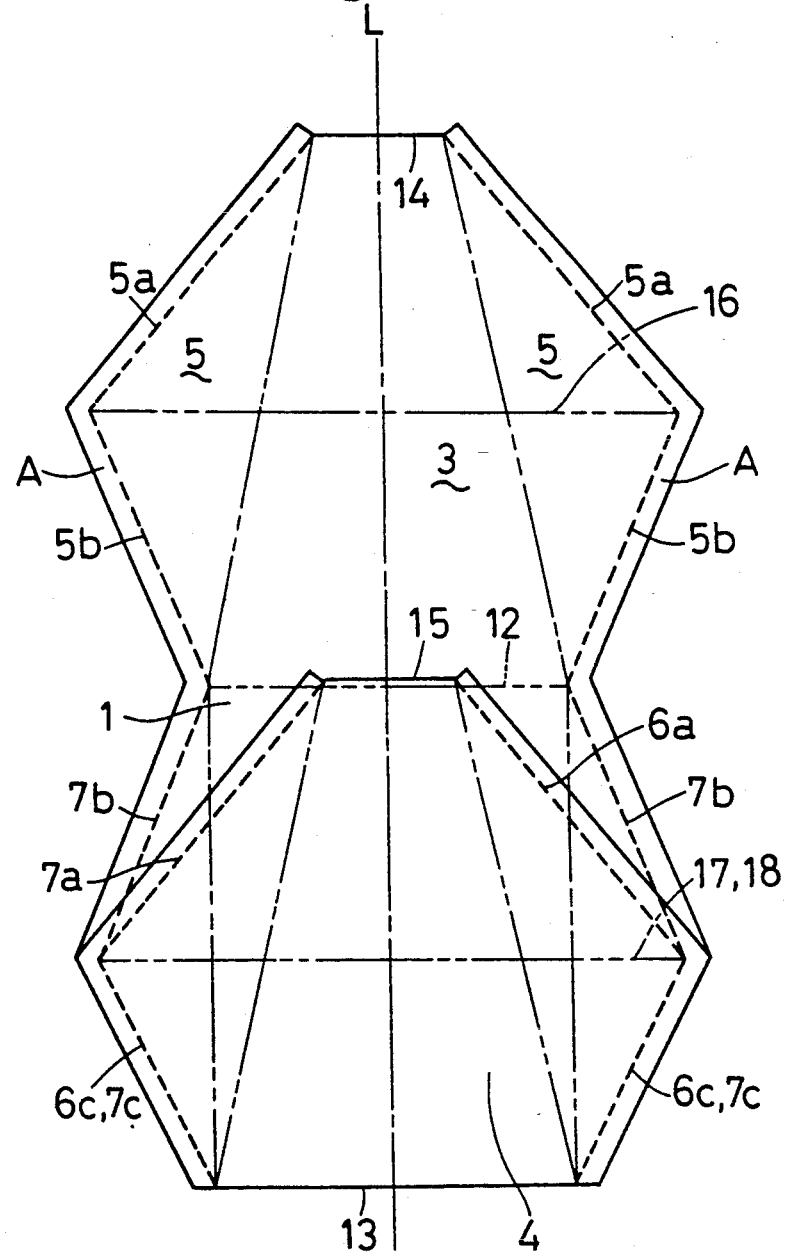
FIG. 17 to FIG. 21 are illustrations showing sequential steps of a method of manufacturing a bag by the use of the one-piece cloth in FIG. 16, with FIG. 21 being a schematic perspective view of the bag thus manufactured with the lip portion omitted.
Figure 18:
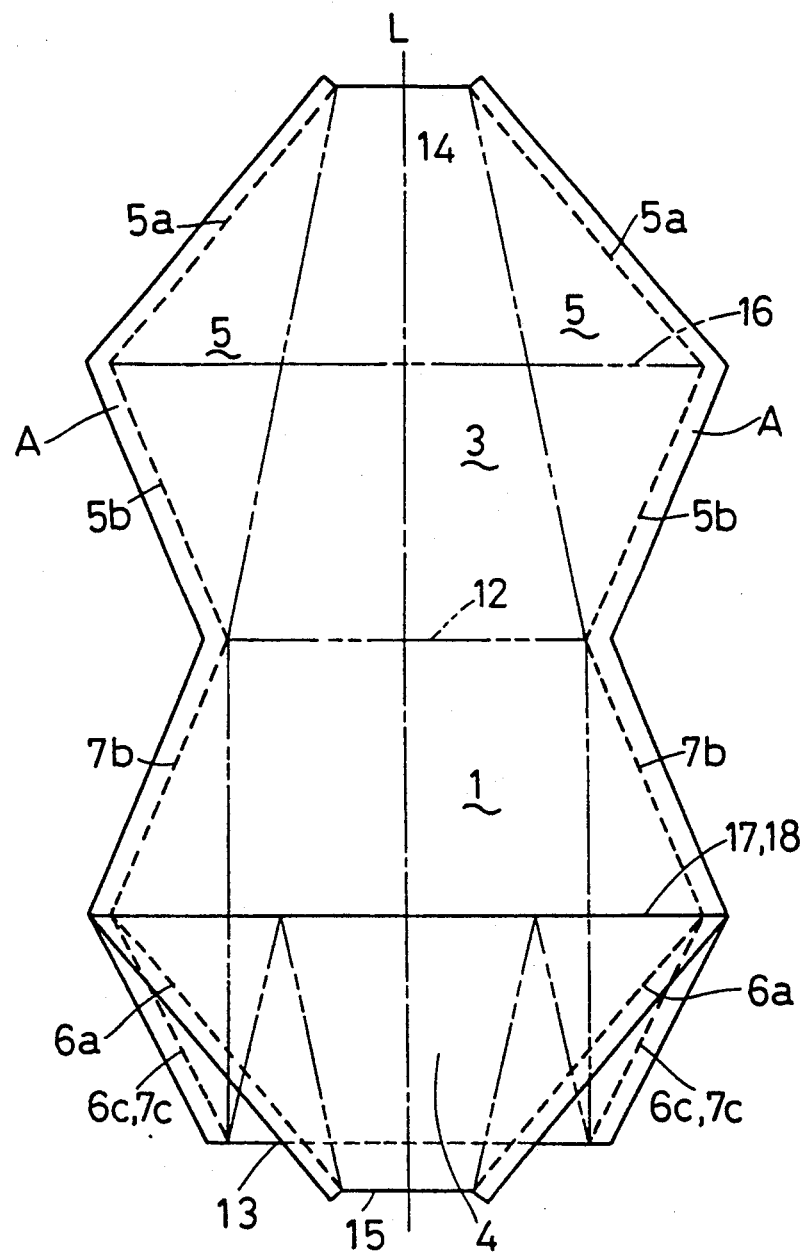

The one-piece cloth thus constructed and shown in FIG. 16 is fashioned into a quadrilateral prismoidal body as follows (FIG. 17 to FIG. 21): The second trapezoidal section 4 side is folded up along the second boundary line 13 onto the central section 1 side to superpose two congruent trapezoids (6c,7c sides)one upon the other and the adjoining sides 6c,7c of triangular sections 6,7 are sewed together (FIG. 17). Here, both lines 17,18 are in register with each other. In this state, the shorter end side 15 (trapezoid) is again folded back along the line 17 (FIG. 18).

Figure 19:
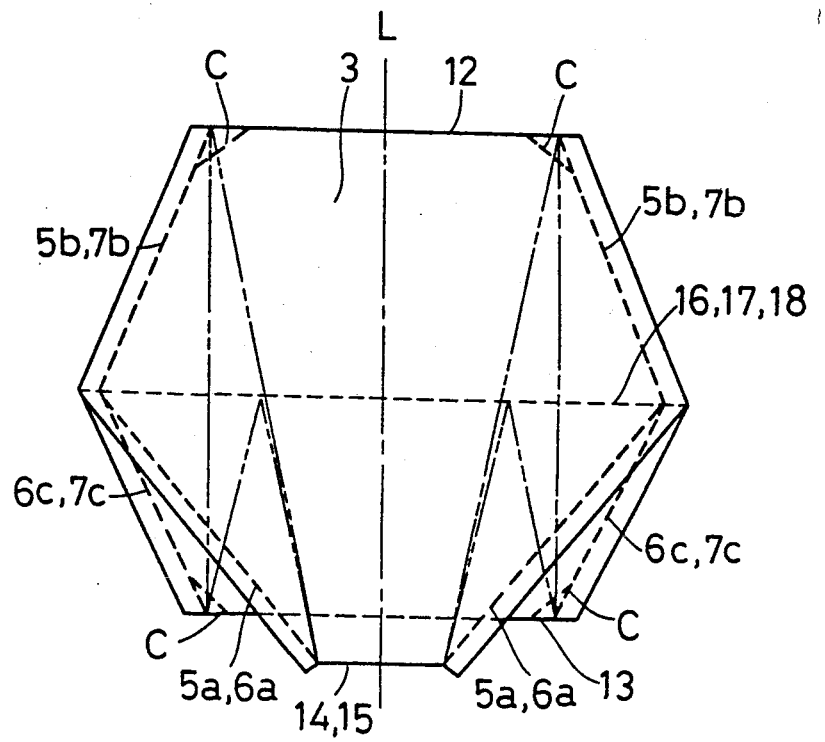

On the other hand, the first trapezoidal section 3 side is folded down along the first boundary line 12 to superpose two congruent trapezoids (5b,7b sides) one upon the other and the superposed adjoining sides 5b,7b are sewed together (FIG. 19). At that time, the lines 16,17,18 are in register with one another, and on the same line.

Figure 20:
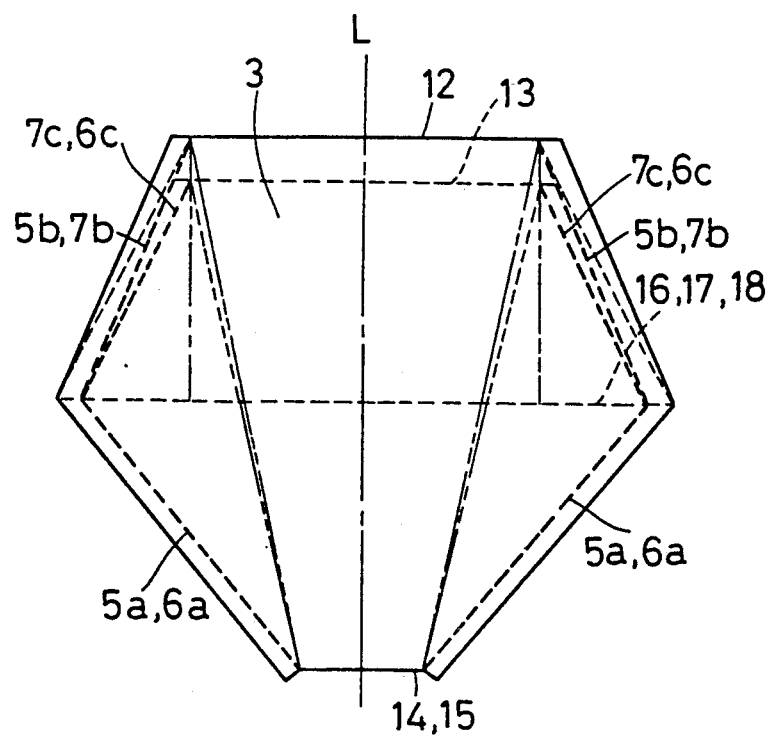

The superposed trapezoids of the 6c,7c sides, which are now beneath the superposed trapezoids of the 5a,6a sides, are again folded oppositely along the lines 17,18 and placed beneath the 5b,7b sides (FIG. 20). In that state, the sides 5a,6a thus superposed are sewed together, whereby a prismoidal body is shaped.

The central section 1 of the prismoidal body may be sewed at their four corners C in a diagonal manner, if desired, so that the corners C may be rendered air-tight.

In the foregoing steps above, it is thus possible to conduct all the sewing work on a straight line and consecutively without the necessity of troublesome registering work of each superposed place, whereby the sewing work and the manufacture of the bag is speeded up.

Figure 21:
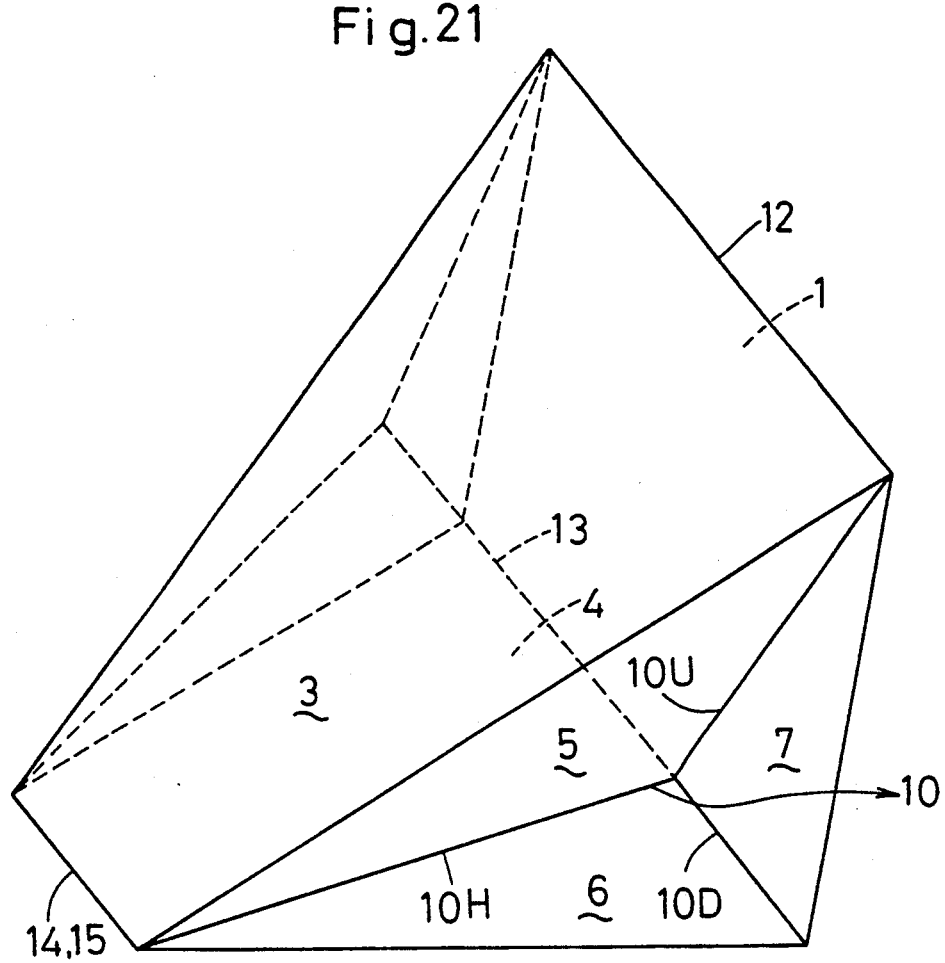

Finally, the prismoidal body is turned inside out in a manner drawing the inside out of the opening surrounding the end sides 14,15, and a bag having a generally truncated quadrilateral pyramidal shape is yielded, as shown in FIG. 21.

According to the method of this embodiment, it is naturally possible to change the order of the steps described above and shown in the drawings. First, folding may be started from the first trapezoidal section 3 side onto the central section.

Further, it is possible to modify the foregoing steps. First, the second trapezoidal 4 side is folded up along the second boundary line 13 and the 15 side trapezoid is folded back along the line 17. Next, the first trapezoidal 3 side is folded down along the first boundary line 12, and the adjoining sides 5b,7b are superposed one upon the other and sewed together. The congruent trapezoids on 5a,6a sides now superposed are again turned back. The adjoining sides 6c,7c superposed and now having thereon folded part are sewed together. Thereafter, the sides 5a,6a are sewed together. Of course, it is possible to start from the folding of the first trapezoidal 3 side.

The bag assuming a quadrilateral prismoidal shape has, on each lateral face portion thereof, the Y-like seam line 10 diverging from the lip to base portions (FIG. 21).

Figure 22:
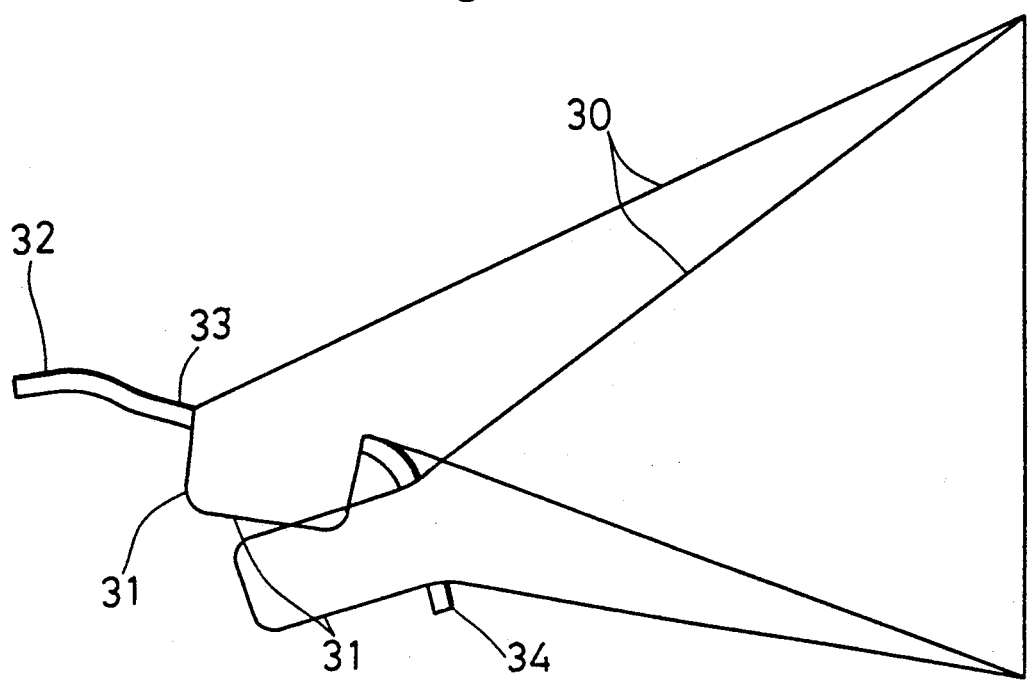
FIG. 22 is a schematic illustration showing two mounting types of a bag to an instrument panel of a vehicle.
Figure 23A:
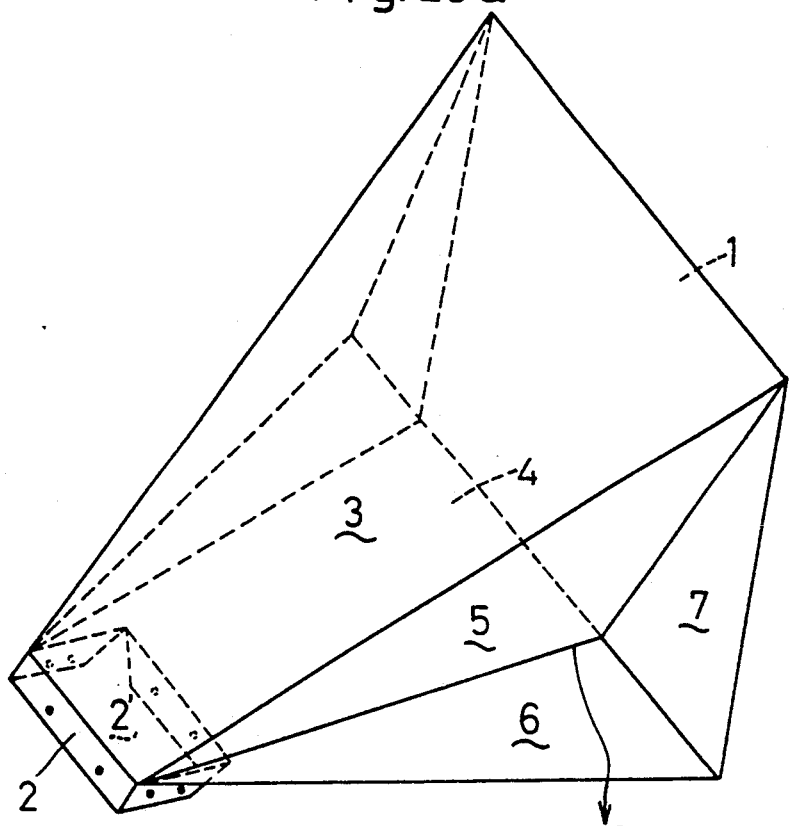
FIG. 23a and FIG. 23b are schematic perspective views showing a bag having its lip portion for upper face mounting to an instrument panel and a bag having its lip portion for frontal face mounting to an instrument panel.

FIG. 22 illustrates two mounting ways of a bag 30 to an instrument panel 32 of a vehicle in comparison. The instrument panel 32 generally has a horizontal upper face 33 and a vertical frontal face 34 adapted to face a passenger. The bag is enclosed in a housing 31 and mounted through an opening apertured in either of them to the instrument panel.

Where a bag is mounted on a horizontal upper face 33 of instrument panel 32, its lip portion corresponding to end sections 2,2' is formed as shown in FIG. 23a. One example of constitution of the end sections 2,2' in a one-piece cloth is shown in FIG. 24, wherein one end section 2 extends from the shorter end side 14 of the first trapezoidal section 3 while the other end side 2' includes a subsection 21 extending from the shorter end side 15 of the second trapezoidal section 4 (from both edges of it a slit is defined) and two subsections 22,22 extending from endmost parts of the end sides 6a,6a through transitional extensions 19,19.

Figure 25:
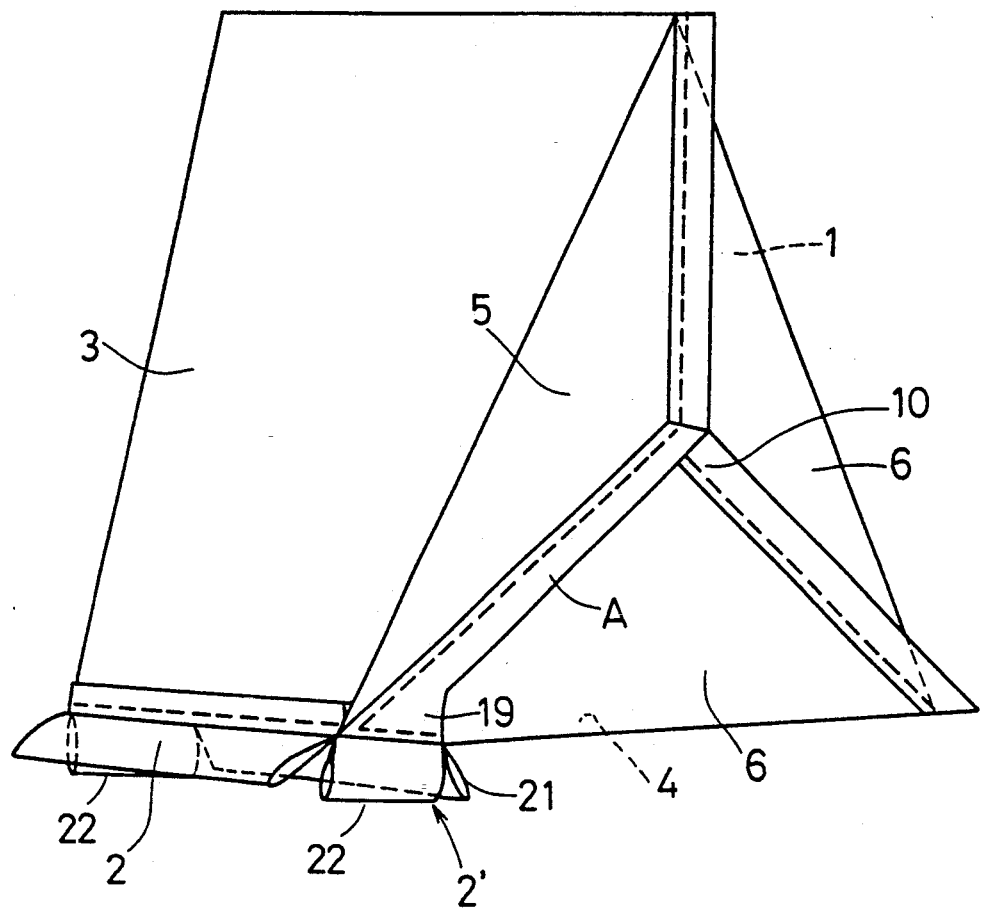
FIG. 25 is a schematic perspective view of a bag, at its reverse side, made of the one-piece cloth in FIG. 24 showing its lip portion.
Figure 26:
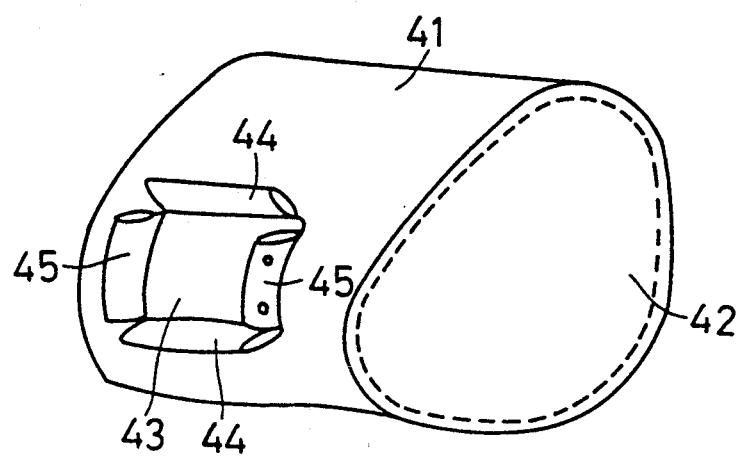
FIG. 26 is a perspective view of a prior art bag for front seat passenger.
Figure 27A:
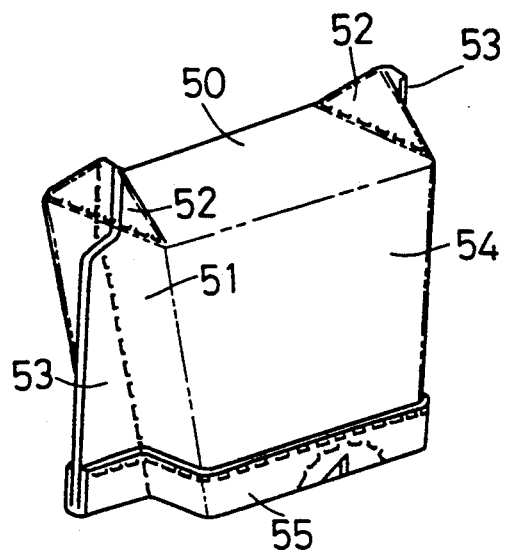
FIG. 27a and FIG. 27b are perspective views of another prior art bag for front seat passenger showing the bag respectively at its reverse side and at its obverse side.
Figure 27B:
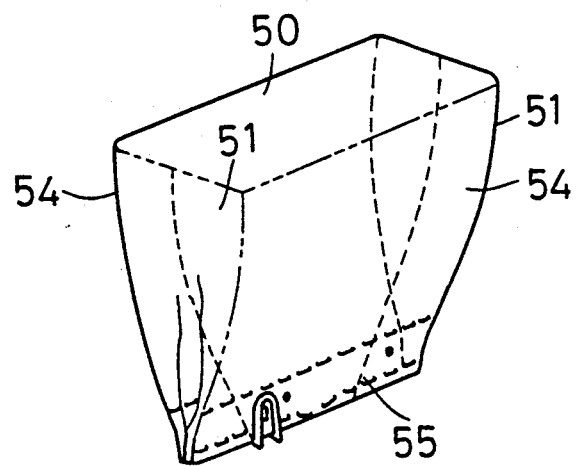

From the one-piece cloth in FIG. 24, a prismoidal bag, whose reverse side is illustrated in FIG. 25, is yielded, in which the end sections 2, 2'(21,22,22) are each sewed in a sack form as a retainer fitting thereby to form the quadrilateral lip portion of the bag defining an opening. The lip portion, when mounted, faces downwards.

Figure 23B:
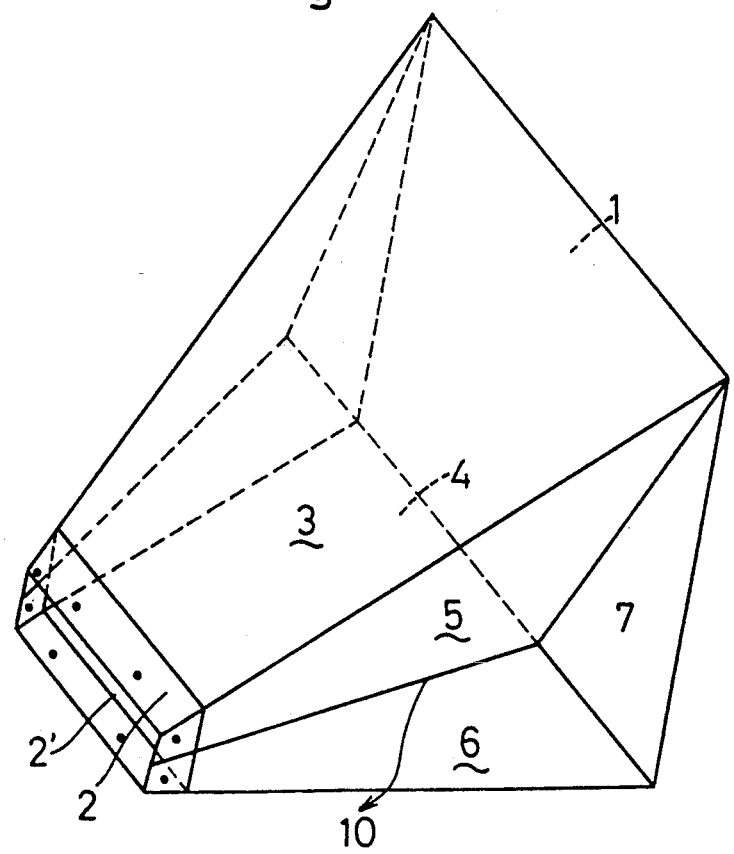

On the other hand, where a bag is mounted on a frontal face 34 of the instrument panel 32, the lip portion is formed, as shown in FIG. 23b, by sewing of two rectangular end sections 2,2' as in FIG. 1, FIG. 7 to sacks as retainer fittings.

Thus far described above, according to this invention, by the use of one-piece cloths of specified figures, it is possible to manufacture bags assuming a truncated quadrilateral pyramidal shape which are used for airbag restraint systems for front seat passenger. The bags each have a rectangular or square base portion capable of facing and receiving the passenger by the extension of the bag upon inflation and deployment, lateral face portions that can exhibit a strap effect by the T-like joints or Y-like joints, upper and lower face portions, and a quadrilateral lip portion adapted to be attached to a retainer in a housing and capable of admitting through its opening a gas from the system.

The use of one-piece cloths makes it possible to optionally design and change the figures of the cloths to accommodate the position of the passenger and the mounting site of a module, in order to obtain an optimal size and shape of the bag for good restraint performances of the passenger. Further, since the bags thus produced from the one-piece cloths are free from useless obstructive parts, they are readily collapsible and can be enclosed within a small-capacity, light-weight housing for bag. The bags maintain an inherent flexibility of the fabric cloth that advantageously affects the passenger upon contacting with the bag.

Because of the use of the one-piece cloths of specified figures, the methods for manufacturing the aforesaid bags have the following advantages:

Since all the sewing work can be done in a plane, straight manner, no skilled art is necessitated and automatization of the method is enabled.

The process steps of the method can be significantly reduced in number, and thus be simplified, with the result that manufacturing cost is curtailed and mass production of bags is feasible.

In sewing, since the fabric grains of a one-piece cloth subjected to cutting coincide with the roll direction and width direction of a fabric roll, all the sides of the cloth to be sewed have biased grains with the result that it is possible to ensure the sewing strength.

Having described the present invention in detail, it is obvious that those skilled in the art will be able to make variations and modifications thereto without departing from the scope of the invention.

What is claimed is:

1. An inflatable bag for airbag passive restraint systems for a front seat passenger having a generally quadrilateral prismoidal body and being made of a one-piece cloth, wherein said bag comprises a base portion of a right-angled quadrilateral shape adapted to face and receive the passenger by the extension of the bag upon inflation and deployment, opposing lateral face portions of a generally trapezoidal shape, opposing upper and lower face portions of a generally trapezoidal form, and a lip portion defining a quadrilateral opening of the prismoidal body for admitting therethrough gas from the system and adapted to be fastened through a housing for the bag to an instrument panel, said lateral face portions having each a T-like joint diverging from the lip portion to the base portion and exhibiting a strap effect capable of regulating the extension and flaring of the bag upon deployment, thus having a tapered profile diverging from the lip to base portions;

said one-piece cloth comprises a first generally trapezoidal section and a second generally trapezoidal section respectively mainly corresponding to the upper and lower face portions of the bag, a central right-angled quadrilateral section corresponding to the base portion of the bag and interposed longitudinally between the first and second trapezoidal sections so that its parallel lateral sides may coincide with parallel longer sides of the first and second trapezoidal sections, a pair of first generally triangular sections extending laterally from nonparallel sides of the first trapezoidal section, a pair of second generally triangular sections extending laterally from nonparallel sides of the second trapezoidal section, the first triangular section and the second triangular section on each lateral side of the cloth having end sides of an equal length and mutually near sides having a total length equal to the length of a longitudinal side of the central section, and respective salient apex angles totaling to about 180°, whereby the first triangular sections and the second triangular sections are adapted cooperatively to form the T-like joints and the lateral face portions.

2. An inflatable bag for a front seat passenger as set forth in claim 1, wherein said end sides of the first and second triangular sections on each lateral side of the cloth are of arc-like outwardly curved lines; and said T-like joints each consist of a substantially horizontally extending curved fraction and a substantially vertical rectilinear fraction.

3. An inflatable bag for a front seat passenger as set forth in claim 2, wherein said one-piece cloth further comprises end sections at least extending from parallel shorter end sides of the first and second trapezoidal sections and adapted to form the lip portion of the bag.

4. An inflatable bag for a front seat passenger as set forth in claim 3, wherein one of said first and second trapezoidal sections has such a figure that the shorter end side includes a central shorter side and both declining shoulder parts next to the central shorter side; and one of said end sections includes a subsection extending from the central shorter side and two subsections extending from both shoulder parts, thus being adapted to form the lip portion together with the other end section.

5. An inflatable bag for a front seat passenger as set forth in claim 3, wherein one of said end sections includes a subsection extending from the shorter end side of one of the trapezoidal sections and two subsections having each a side extension extending laterally from endmost parts of the end sides of the first or second triangular sections adjacent to the one trapezoidal section.

6. An inflatable bag for airbag passive restraint systems for a front seat passenger having a generally quadrilateral prismoidal body and being made of a one-piece cloth, wherein said bag comprises a base portion of a right-angled quadrilateral shape adapted to face and receive the passenger by the extension of the bag upon inflation and deployment, opposing lateral face portions of a generally trapezoidal shape, opposing upper and lower face portions of a generally trapezoidal shape, and a lip portion defining a quadrilateral opening of the prismoidal body for admitting therethrough gas from the system and adapted to be fastened through a housing for bag to an instrument panel, said lateral face portions having each a Y-like joint diverging from the lip portion toward the base portion and exhibiting a strap effect capable of suppressing flaring or protrusion of the bag upon inflation and deployment, thus having a tapered profile diverging from the lip to base portions;

said one-piece cloth comprises a first generally trapezoidal section and a second generally trapezoidal section corresponding mainly to the upper and lower face portions respectively of the bag, a central right-angled quadrilateral section corresponding to the base portion of the bag and being longitudinally interposed between the first and second trapezoidal sections so that its lateral parallel sides may be common to parallel longer sides of both trapezoidal sections, a pair of first generally triangular sections extending laterally from non-parallel sides of the first trapezoidal section, a pair of second generally triangular sections extending laterally from non-parallel sides of the second trapezoidal section, and a pair of third generally triangular sections extending laterally from parallel longitudinal sides of the central section, the first triangular section and the second triangular section on each lateral side of the cloth having end sides of an equal length, the first triangular section and the third triangular section on each lateral side of the cloth having adjoining sides of an equal length, the third triangular section and the second triangular section on each lateral side of the cloth having adjoining sides of an equal length, whereby the first, second and third triangular sections on respective sides of the cloth are adapted cooperatively to form the lateral face portions together with the Y-like joints.

7. An inflatable bag for a front seat passenger as set forth in claim 6, wherein said end sides of the first and the second triangular sections on each lateral side of the cloth are of arc-like outwardly curved lines and the Y-like joints each consist of a substantially horizontally extending curved fraction and bifurcated rectilinear fractions.

8. An inflatable bag for a front seat passenger as set forth in claim 7, wherein said one-piece cloth further comprises end sections extending at least from parallel shorter end sides of the first and second trapezoidal sections and adapted to form the lip portion.

9. An inflatable bag as set forth in claim 8, wherein one of said first and second trapezoidal sections has such a figure that the shorter end side includes a central shorter side and both declining shoulder parts next to the central shorter side; and one of said end sections includes a subsection extending from the central shorter side and two subsections extending from both shoulder parts, thus being adapted to form the lip portion together with the other end section.

10. An inflatable bag as set forth in claim 8, wherein one of said end sections includes a subsection extending from the shorter end side of one of both trapezoidal sections and two subsections having each a side extension extending laterally from endmost parts of the end sides of the first or second triangular sections adjacent to the one trapezoidal section.

11. An inflatable bag for a front seat passenger as set forth in claim 6, wherein on each lateral side of the one-piece cloth, said adjoining sides of the first and third triangular sections have an interior angle bisected by a first boundary line between the first trapezoidal section and the central section into two equal angles, said adjoining sides of the third and second triangular sections have an interior angle bisected by a second boundary line between the central section and the second trapezoidal section into two equal angles, said end side of the first triangular section and a shorter end side of the first trapezoidal section make an interior angle equal to the interior angle made by the end side of the second triangular section and a shorter end side of the second trapezoidal section, the first, second and third triangular sections have salient apex angles summing to 360°, and said shorter end sides of the first trapezoidal section and second trapezoidal section are equal in length.

12. An inflatable bag for a front seat passenger as set forth in claim 11, wherein said one-piece cloth further end sections extending at least from the shorter end sides of the first and second trapezoidal sections and adapted to form the lip portion.

13. An inflatable bag as set forth in claim 12, wherein one of said end sections includes a subsection extending from the shorter end side of one of both trapezoidal sections and two subsections having each a side extension extending laterally from endmost parts of the end sides of the first or second triangular sections adjacent to the one trapezoidal section, thus being adapted to form the lip portion together with the other end section.

14. A method for manufacturing an inflatable bag for a front seat passenger as set forth in claim 1, which comprises the steps of folding the one-piece cloth along a fold line that bisects the distance between shorter end sides of both trapezoidal sections into two to superpose the end sides of the first and second triangular sections one upon the other on respective lateral sides and sewing them together; registering the respective near sides of the first and second triangular sections with the longitudinal sides of the central section in a superposing manner and sewing them together; thus forming the T-like seam lines to shape the quadrilateral prismoidal body; and turning the body inside out to give the bag.

15. A method for manufacturing an inflatable bag for a front seat passenger as set forth in claim 2, which comprises the steps of: folding the one-piece cloth along fold line, bisecting the distance between shorter end sides of both trapezoidal sections, into two to superpose the end sides assuming the arc-like lines of the first and second triangular sections one upon the other on respective lateral sides of the cloth and sewing them together; registering the respective near sides of both triangular sections with the longitudinal sides of the central section in a superposing manner and sewing them together; thereby forming the T-like seam lines to shape the quadrilateral prismoidal body; and turning the body inside out to yield the bag.

16. A method for manufacturing an inflatable bag as set forth in claim 3, which comprises the steps of: turning up the end sections along respective fold lines toward the first and second trapezoidal sections and sewing the lapped parts together in parallel with the shorter end sides to form sacks, through which to attach a retainer of housing for bag; folding the one-piece cloth along a fold line bisecting the longitudinal distance between the shorter end sides of both trapezoidal sections into two to superpose the respective end sides of arc-like lines of both triangular sections one upon the other and sewing them together; registering the respective near sides of both triangular sections with the longitudinal sides of the central section in a superposing manner and sewing them together; thus forming the T-like seam lines to shape the prismoidal body; and turning the body inside out to give the bag.

17. A method for manufacturing an inflatable bag as set forth in claim 15, which further comprises, after shaping the prismoidal body, sewing the central section at its four corners together with their surroundings in a diagonal manner.

18. A method for manufacturing an inflatable bag for a front seat passenger as set forth in claim 6, which comprises the steps of folding the cloth along a fold line bisecting the longitudinal distance between shorter end sides of both trapezoidal sections into two to register respectively the end sides of the first and second triangular sections with each other in a superposing manner and sewing them together; registering respectively the adjoining sides of the first and third triangular sections with each other in a superposing manner and sewing them together; registering respectively the adjoining sides of the third and second triangular sections with each other in a superposing manner and sewing them together, thereby forming Y-like seam lines and shaping the quadrilateral prismoidal body; and turning the body inside out to give the bag.

19. A method for manufacturing an inflatable bag as set forth in claim 7, which comprises the steps of: folding the cloth along a fold line that bisects the longitudinal distance between shorter end sides of both trapezoidal sections into two to superpose the end sides assuming arc-like lines of the first and second triangular sections one upon the other on both lateral sides of the cloth and sewing them together; registering respectively the adjoining sides of the first and third triangular sections with each other in a superposing manner and sewing them together; registering respectively the adjoining sides of the third and second triangular sections with each other in a superposing manner and sewing them together; thereby forming the Y-like seam lines and shaping the quadrilateral prismoidal body; and turning the body inside out, thus yielding the bag.

20. A method for manufacturing an inflatable bag as set forth in claim 8, which comprises the steps of: turning up the end sections along respective fold lines toward both trapezoidal sections and sewing the resulting lapped parts together in parallel with the shorter end sides to form sacks, through which to attach a retainer of housing for bag; folding the cloth along a fold line that bisects the longitudinal distance between the shorter end sides of both trapezoidal sections into two to register respectively the end sides of arc-like lines of both triangular sections with each other in a superposing manner and sewing them together; registering respectively the adjoining sides of the first and third triangular sections with each other in a superposing manner and sewing them together; registering respectively the adjoining sides of the third and second triangular sections with each other in a superposing manner and sewing them together; thereby forming the Y-like seam lines and shaping the quadrilateral prismoidal body; and turning the body inside out to give the bag.

21. A method for manufacturing an inflatable bag as set forth in claim 19, which further comprises, after shaping the prismoidal body, sewing the central section at its four corners together with their surroundings in a diagonal manner.

22. A method for manufacturing an inflatable bag as set forth in claim 11, which comprises the steps of: folding the cloth along the first boundary line to superpose the adjoining sides of the first and third triangular sections one upon the other on respective lateral sides of the cloth and sewing them together; folding the cloth along the second boundary line to superpose respectively the adjoining sides of the second and third triangular sections one upon the other and sewing them together; folding the cloth, while registering the shorter end sides of both trapezoidal sections with each other in a superposing manner, to superpose respectively the end sides of the first and second triangular sections one upon the other and sewing them together; thereby forming the Y-like seam lines and shaping the quadrilateral prismoidal body; and turning the body inside out to yield the bag.

23. A method for manufacturing an inflatable bag as set forth in claim 12, which comprises turning up the end sections along respective fold lines toward both the trapezoidal sections and sewing the lapped parts together in parallel with the shorter end sides of both trapezoidal sections to form sacks, through which to attach a retainer of housing for bag; folding the cloth along the first boundary line to superpose respectively the adjoining sides of the first and third triangular sections one upon the other and sewing them together; folding the cloth along the second boundary line to superpose the adjoining sides of the second and third triangular sections one upon the other and sewing them together; folding the cloth, while registering the shorter end sides of both trapezoidal sections with each other in a superposing manner, to superpose respectively the end sides of the second and first triangular sections one upon the other and sewing them together; thus forming the Y-like seam lines and shaping the quadrilateral prismoidal body; and turning the body inside out to give the bag.

24. A method for manufacturing an inflatable bag as set forth in claim 22, which further comprises, after shaping the prismoidal body, sewing the central section at its four corners together with their surroundings in a diagonal manner.

* * * * *